Figure 1:
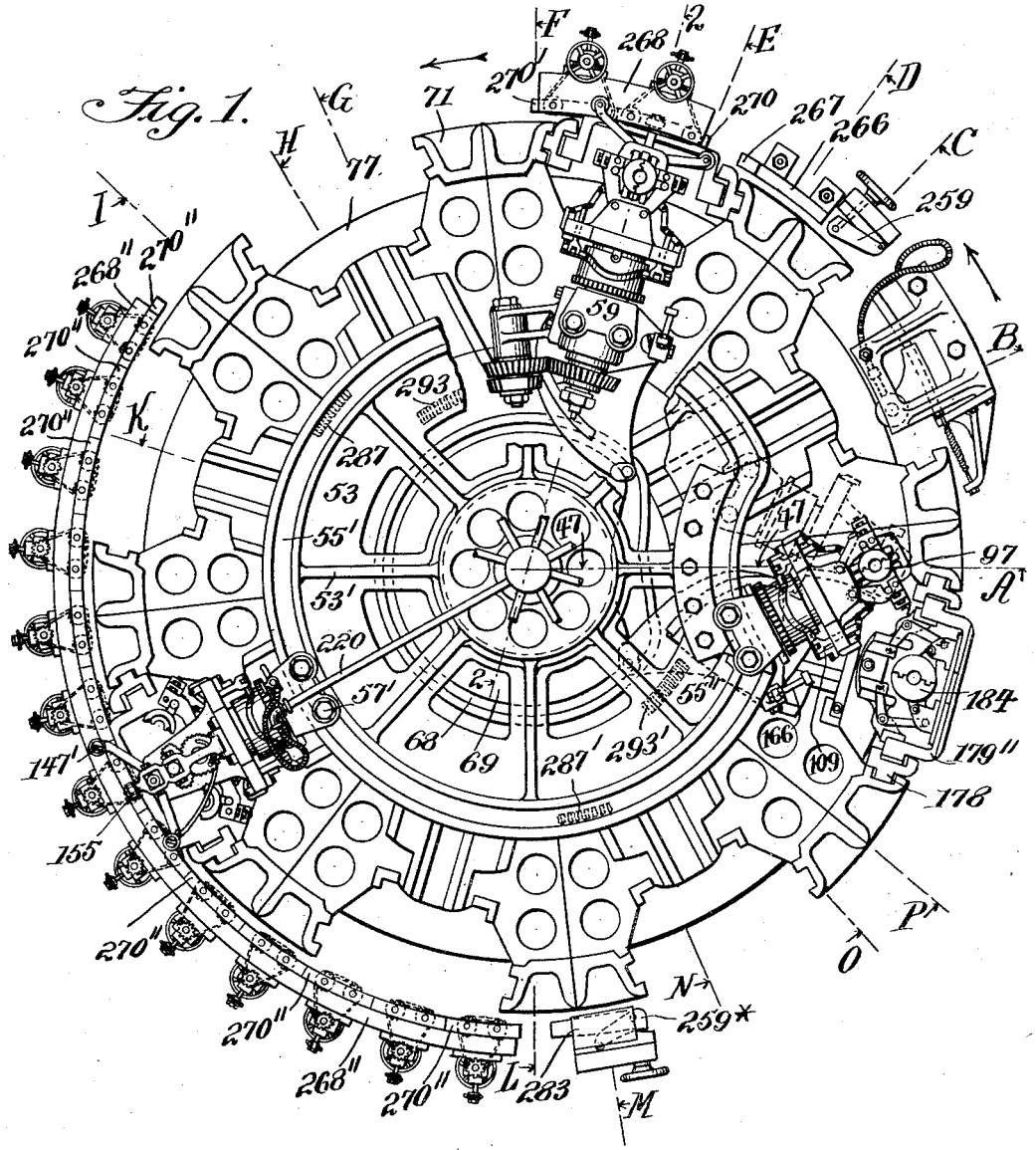

Aug. 7, 1928.

S. L. SEARS 1,679,502

BOTTLE MAKING MACHINE

Original Filed Aug. 14, 1914   17 Sheets-Sheet 1

Inventor
Sydney L. Sears
By
Attorney

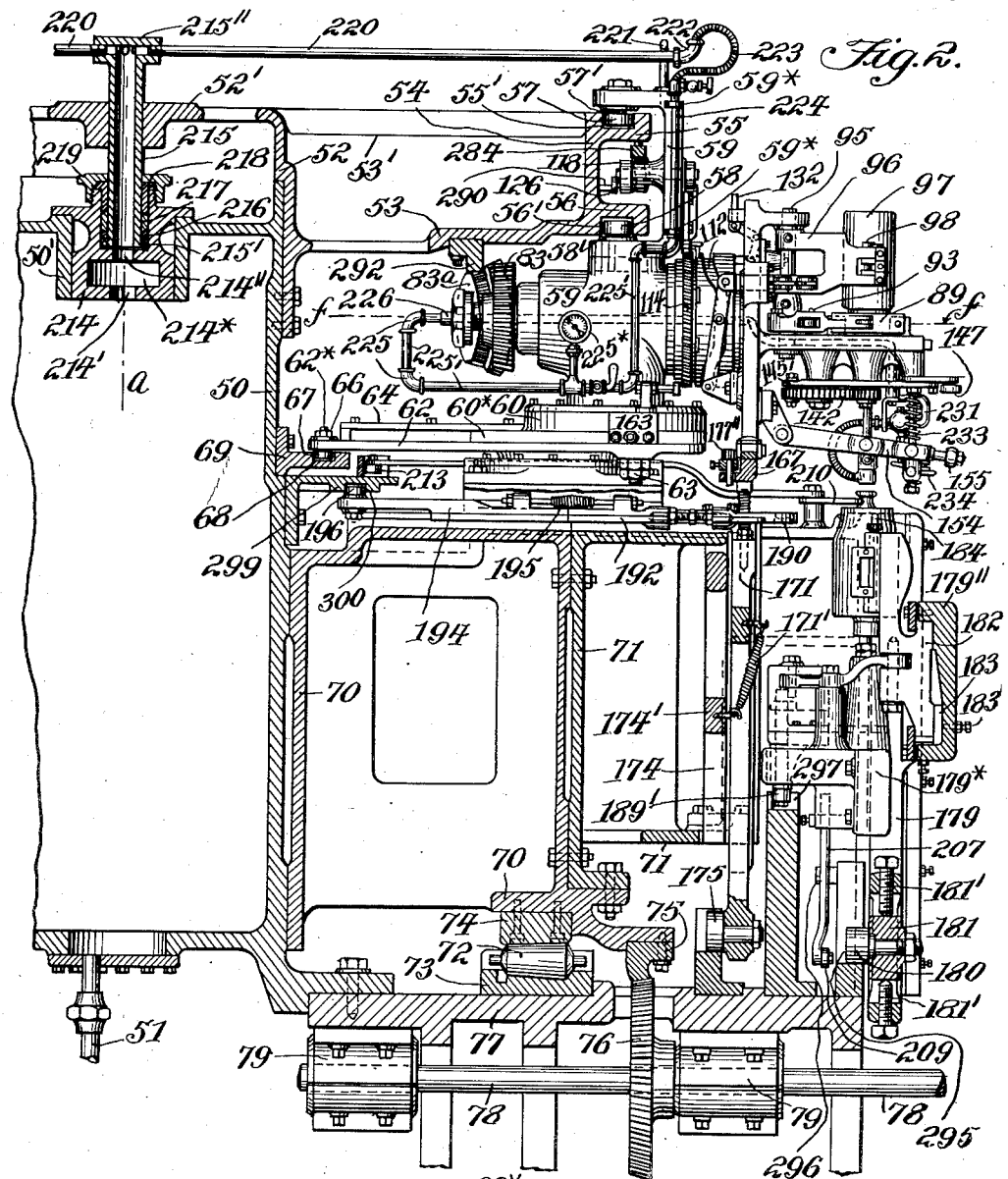

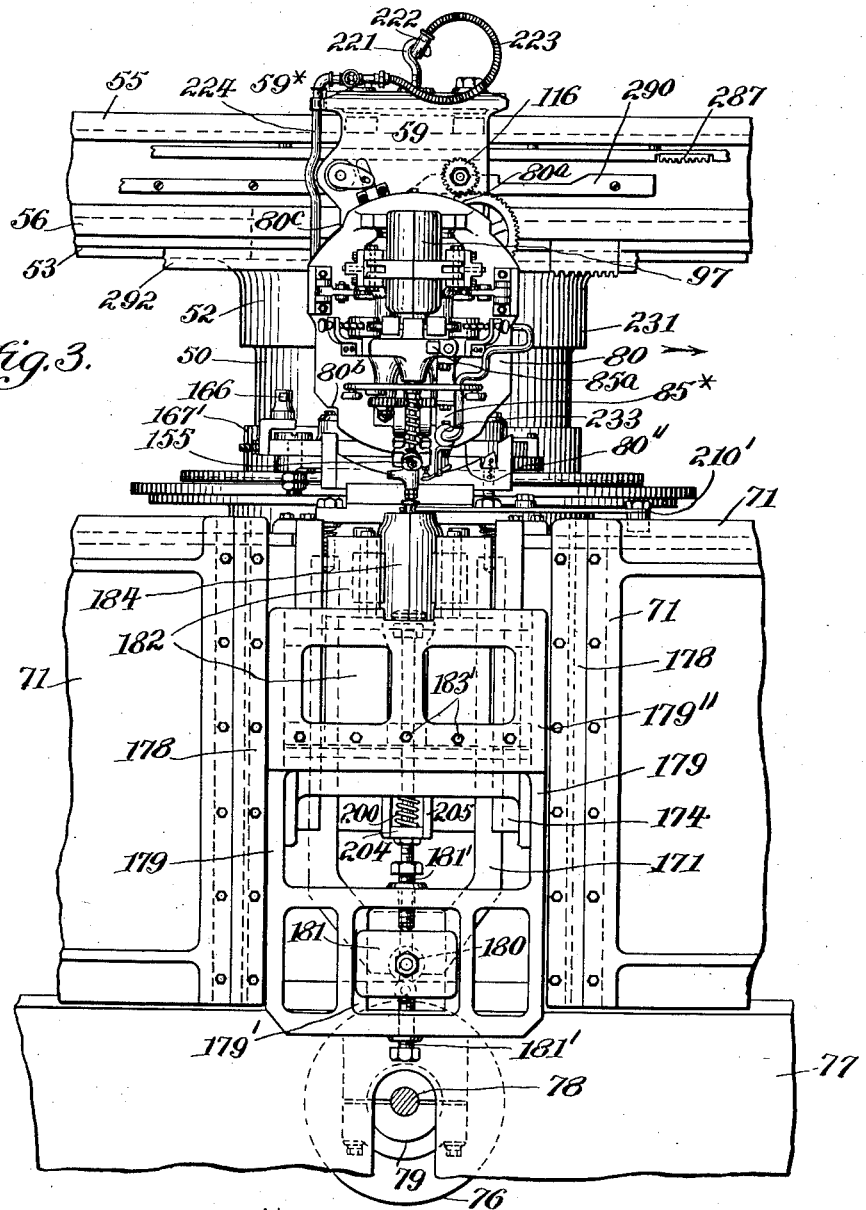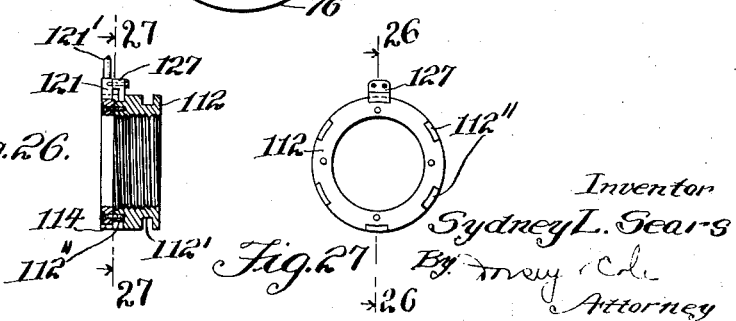

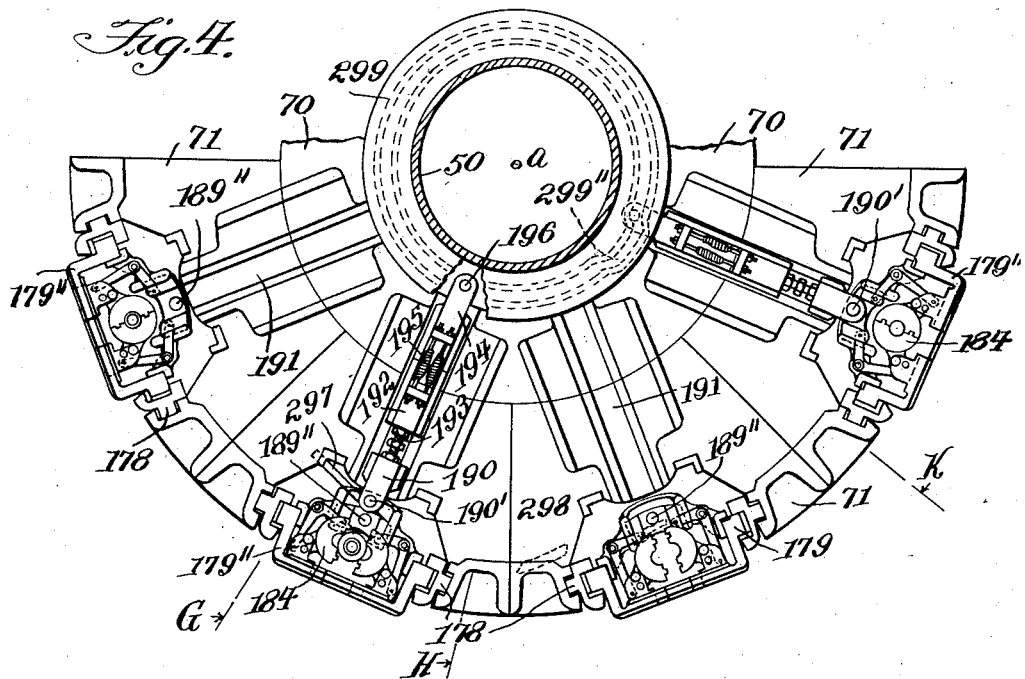

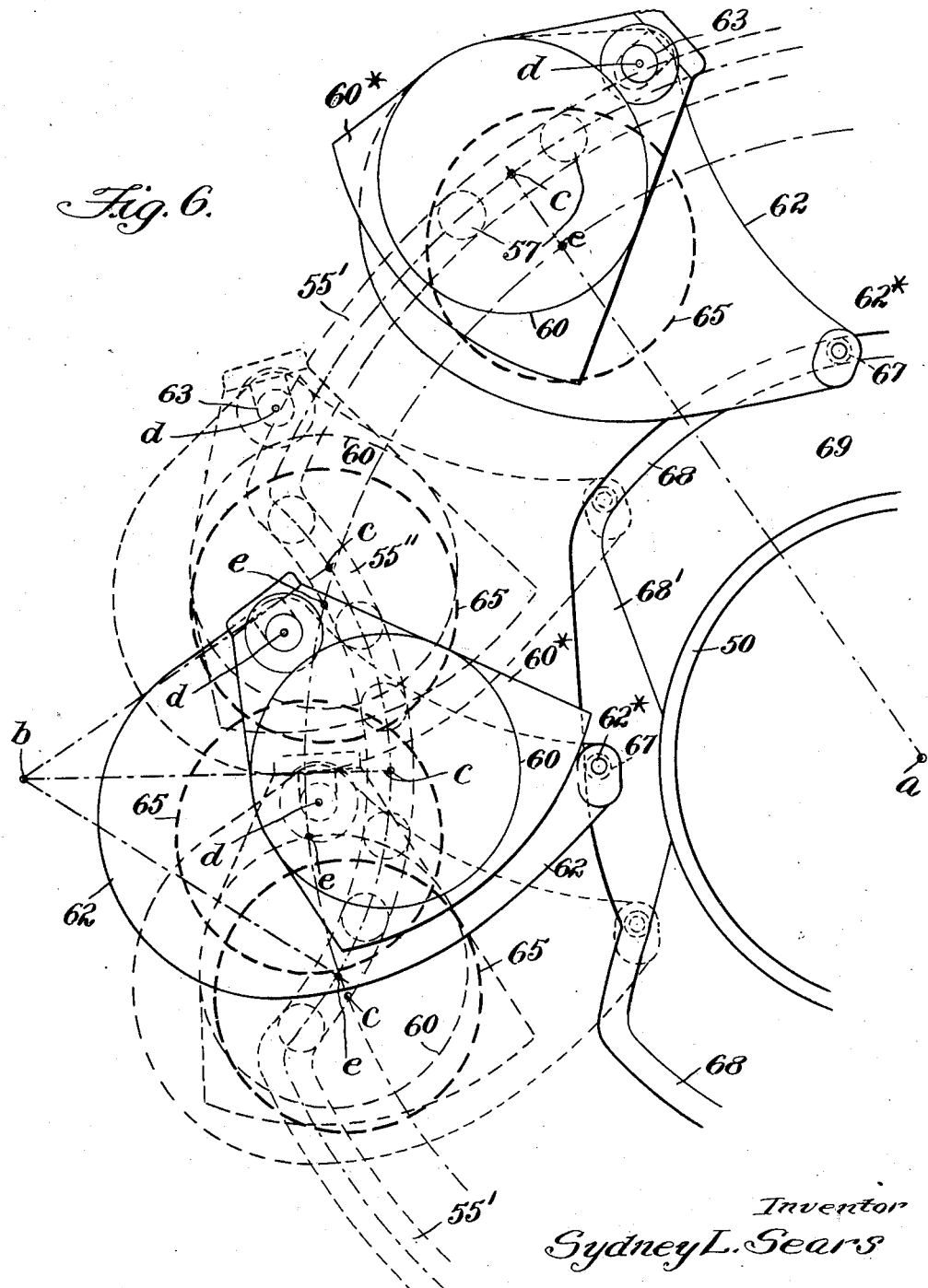

Aug. 7, 1928.
S. L. SEARS
1,679,502
BOTTLE MAKING MACHINE
Original Filed Aug. 14, 1914    17 Sheets-Sheet 6
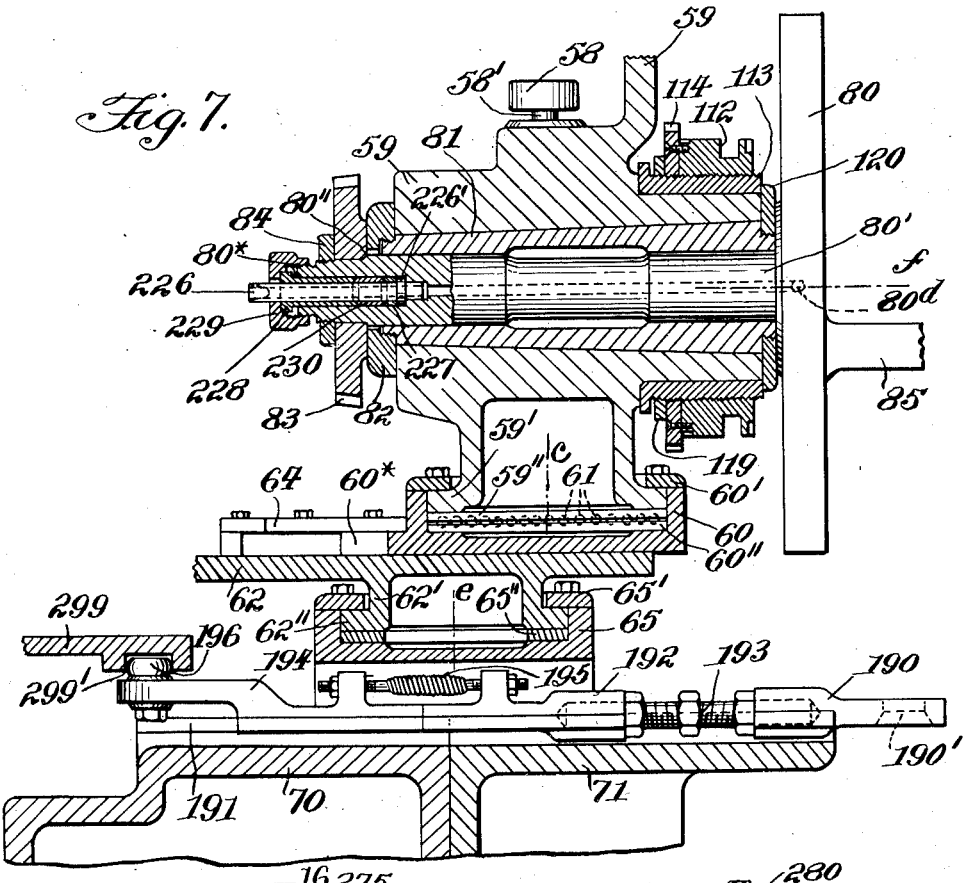
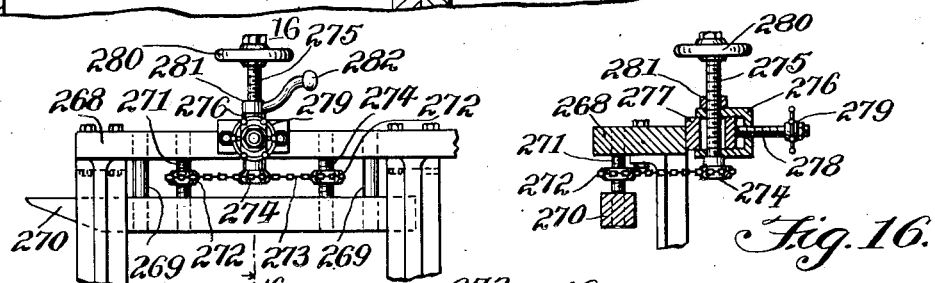
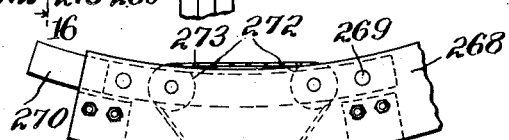
Inventor
Sydney L. Sears
By [signature]
Attorney

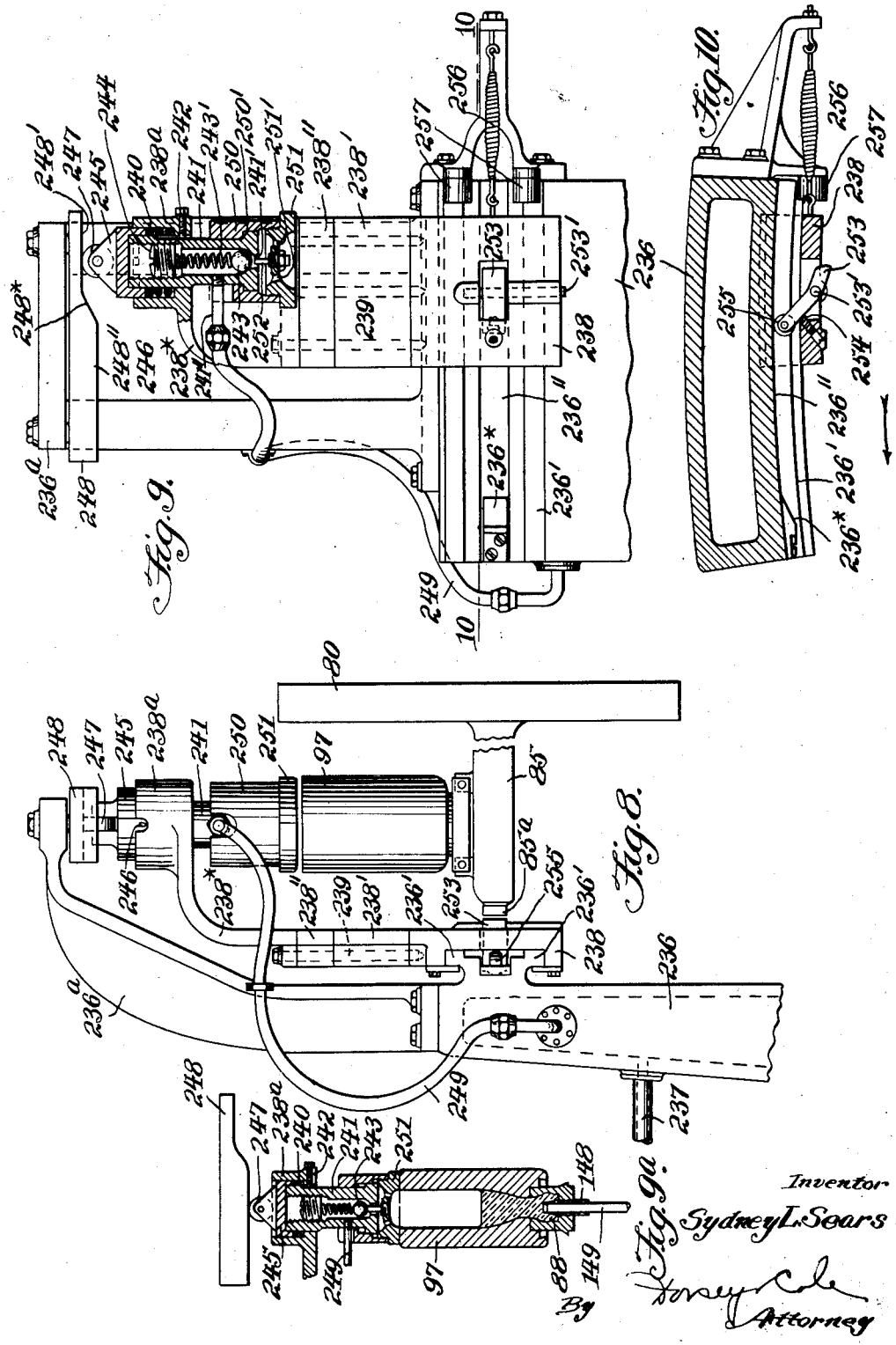

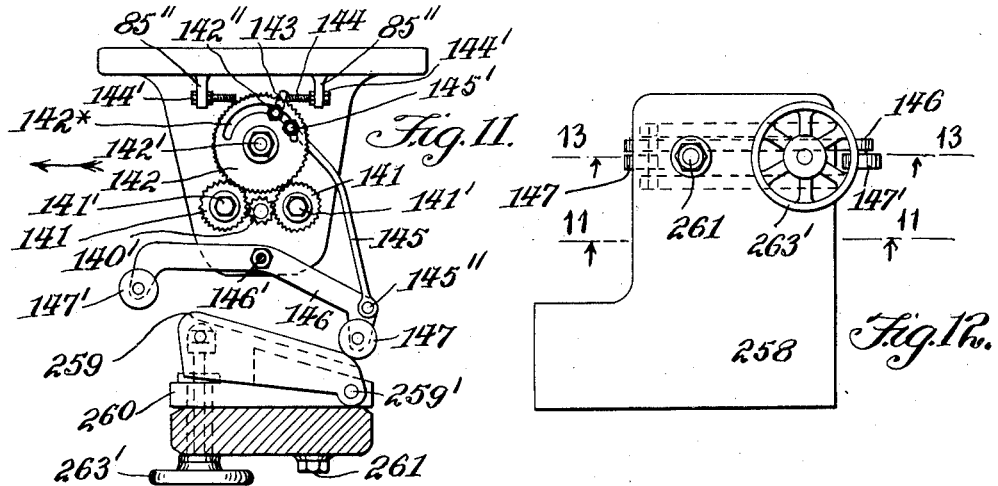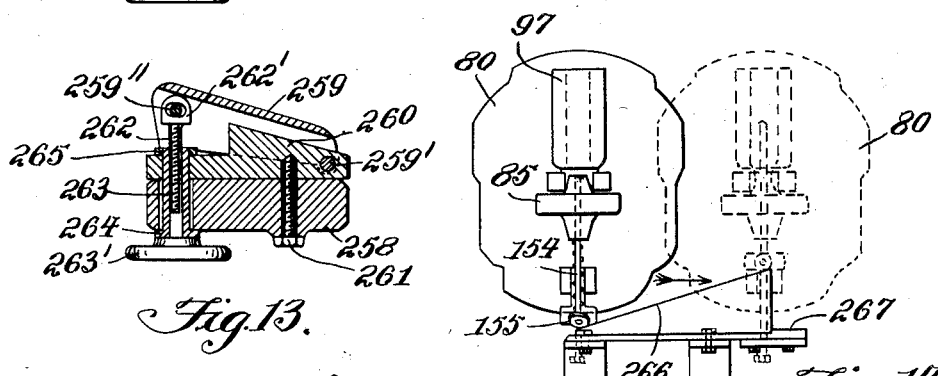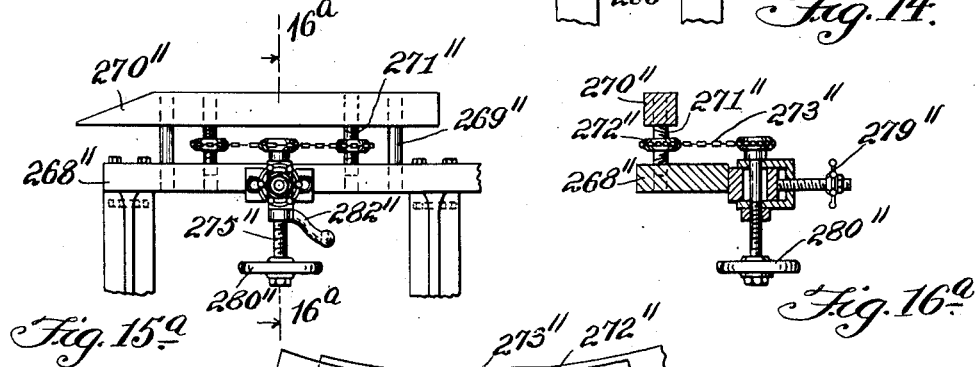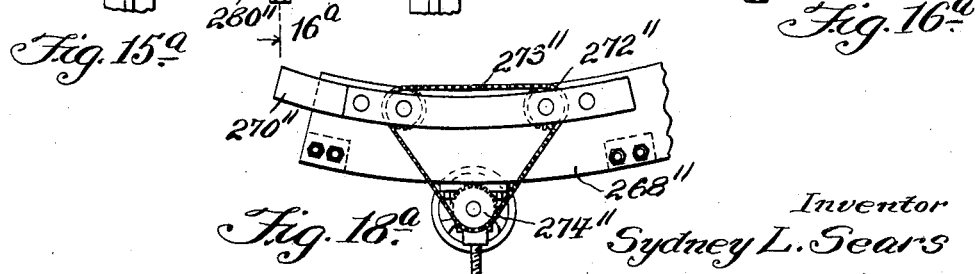

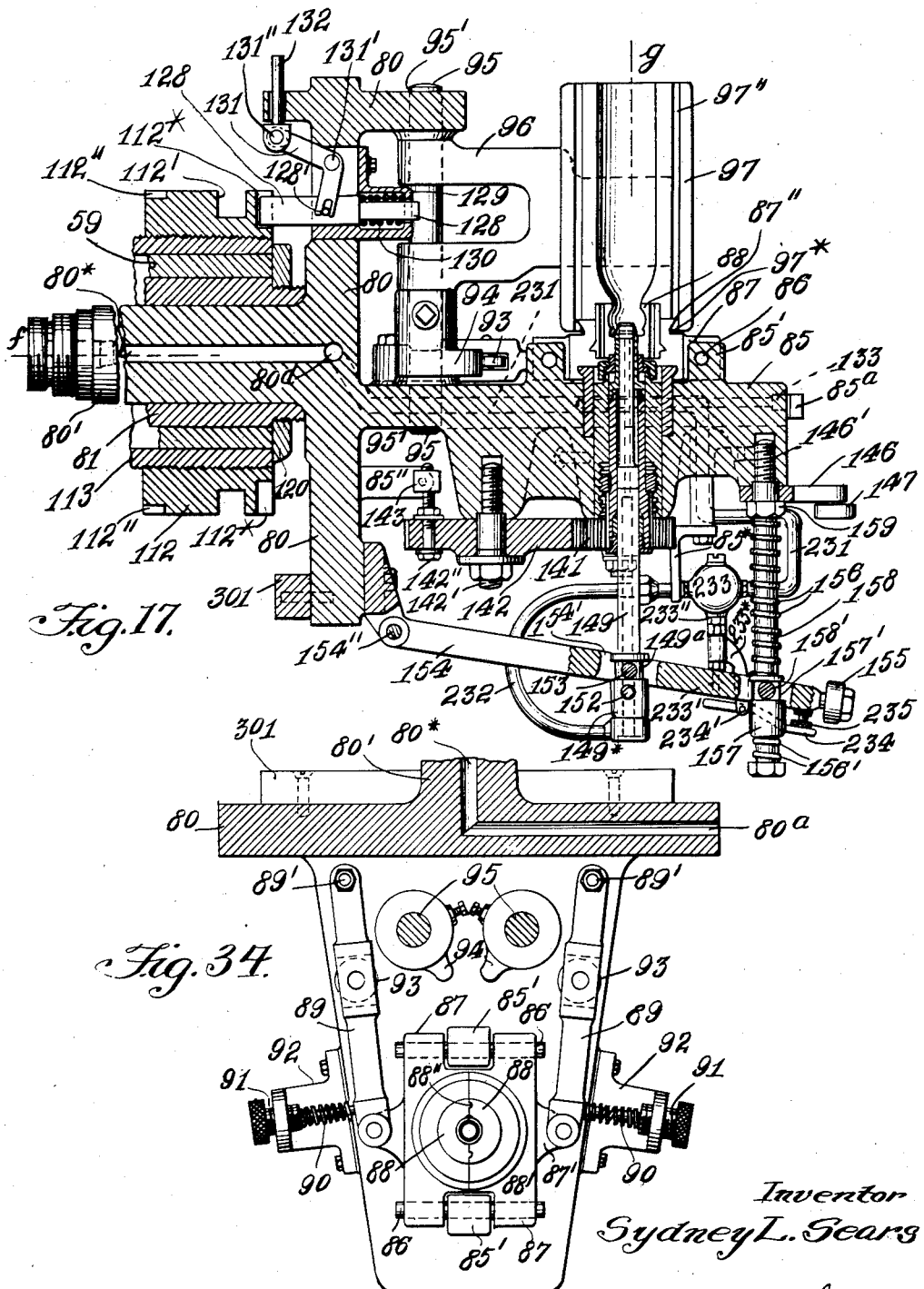

Inventor
Sydney L. Sears

Aug. 7, 1928.

S. L. SEARS

BOTTLE MAKING MACHINE

Original Filed Aug. 14, 1914    17 Sheets—Sheet 11

Inventor
Sydney L. Sears
By Dorsey Cole
Attorney

Inventor
Sydney L. Sears
By [signature]
Attorney

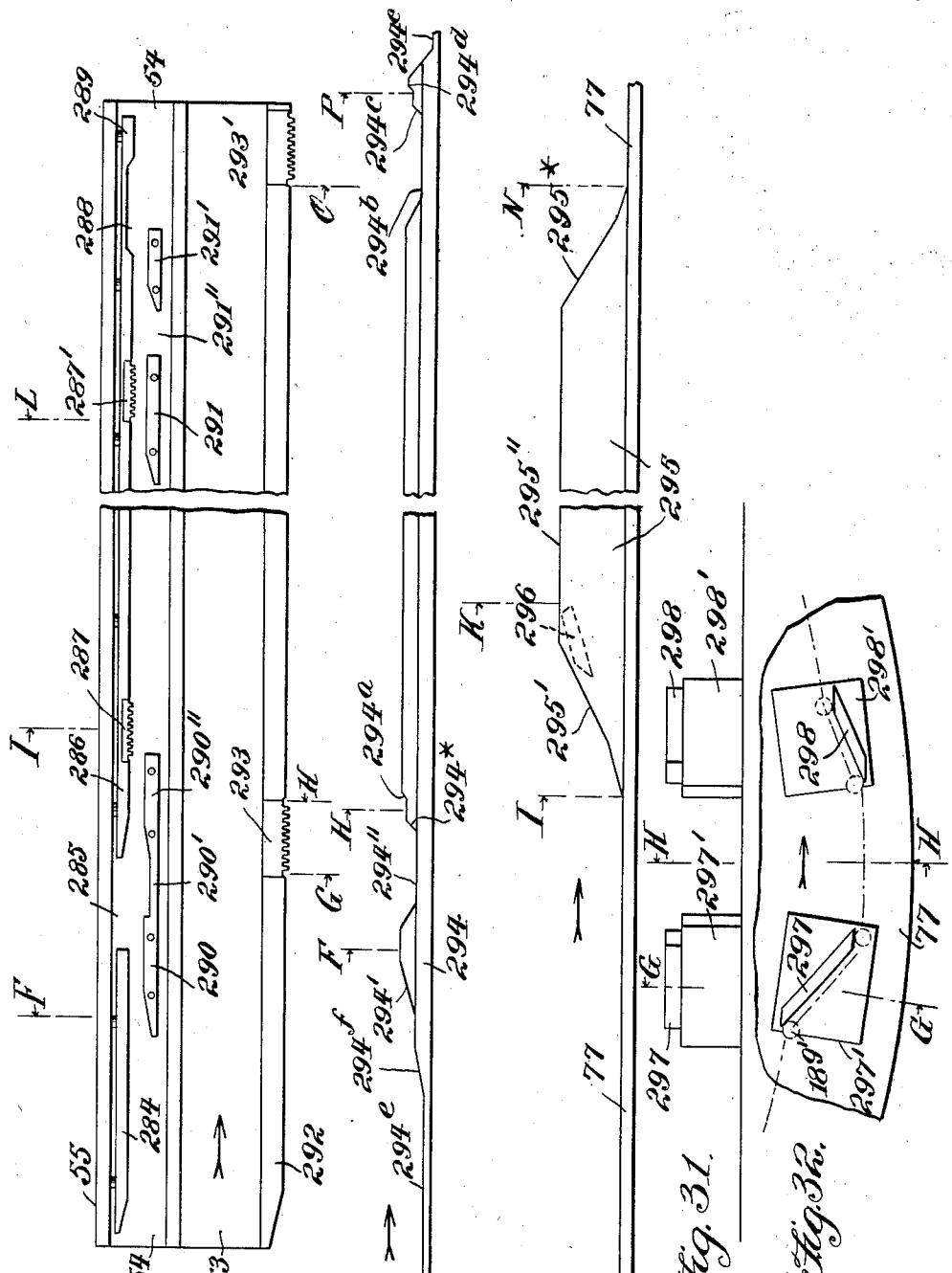

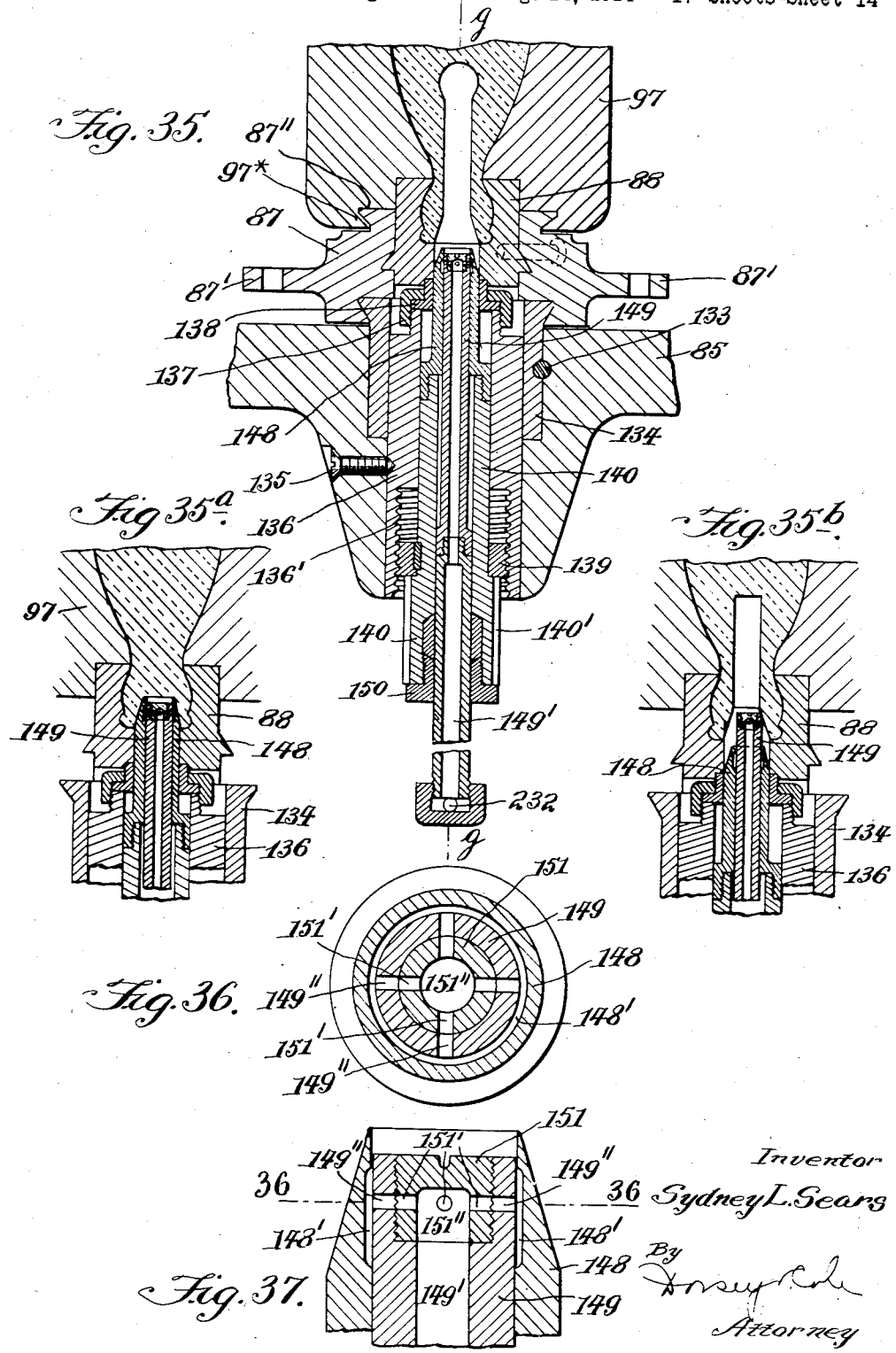

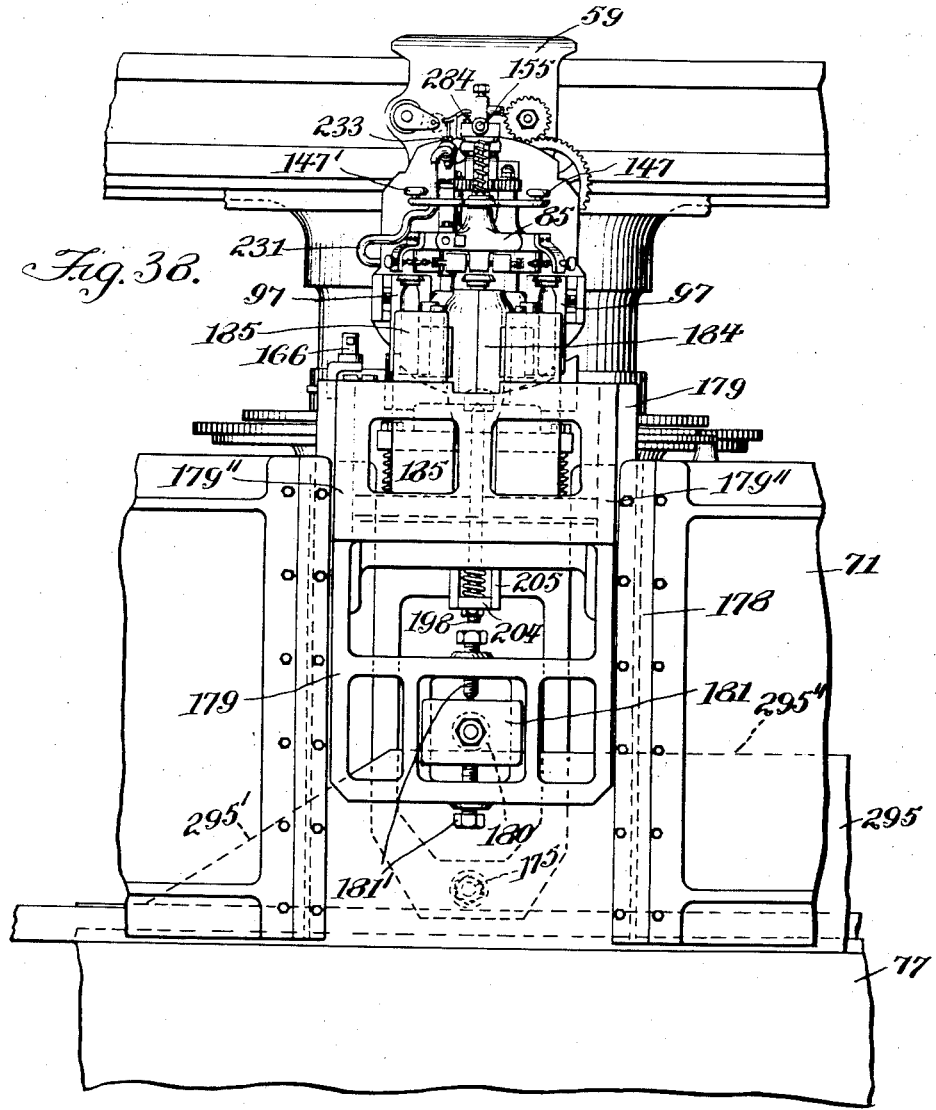
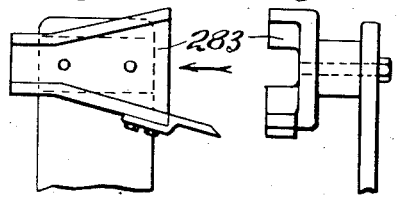

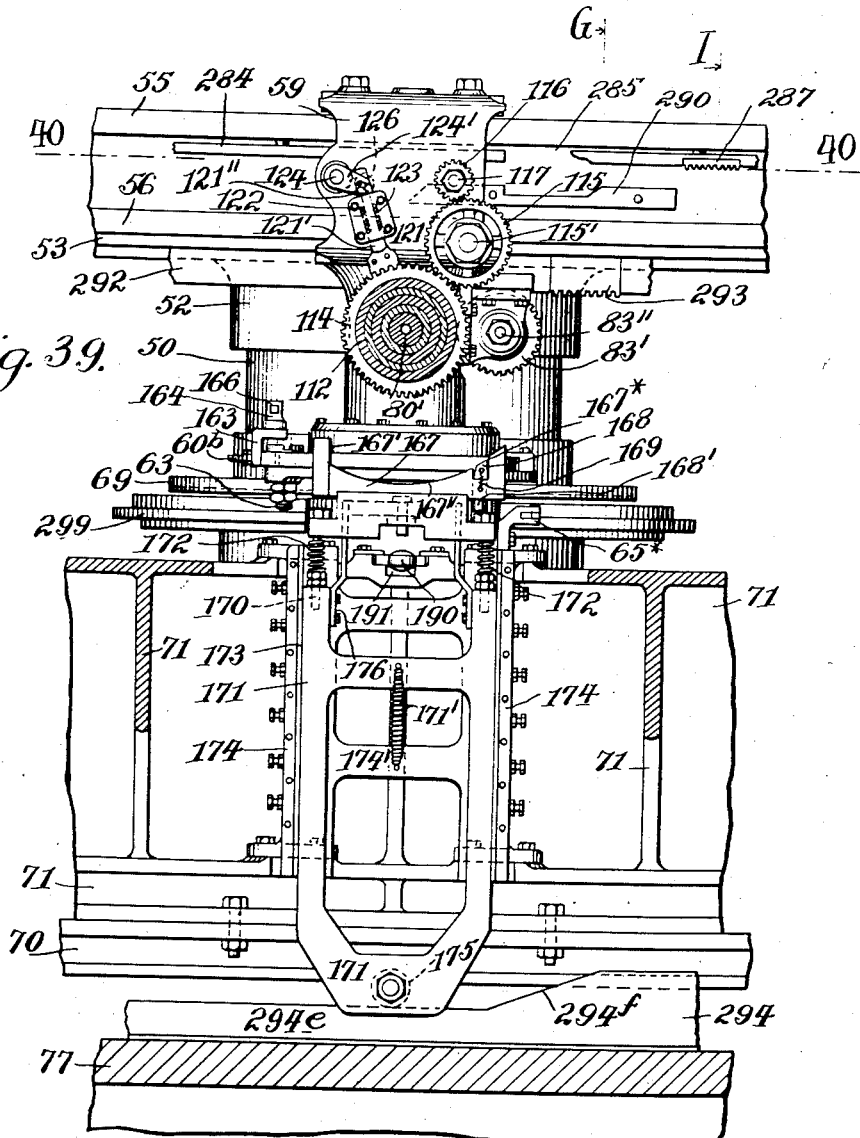
Fig. 39.
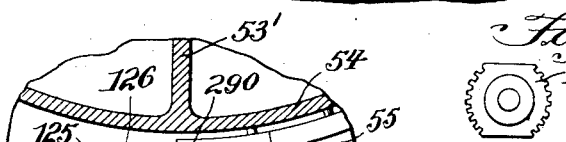
Fig. 40.
Fig. 41.
Inventor
Sydney L. Sears
By Dorsey Cole
Attorney

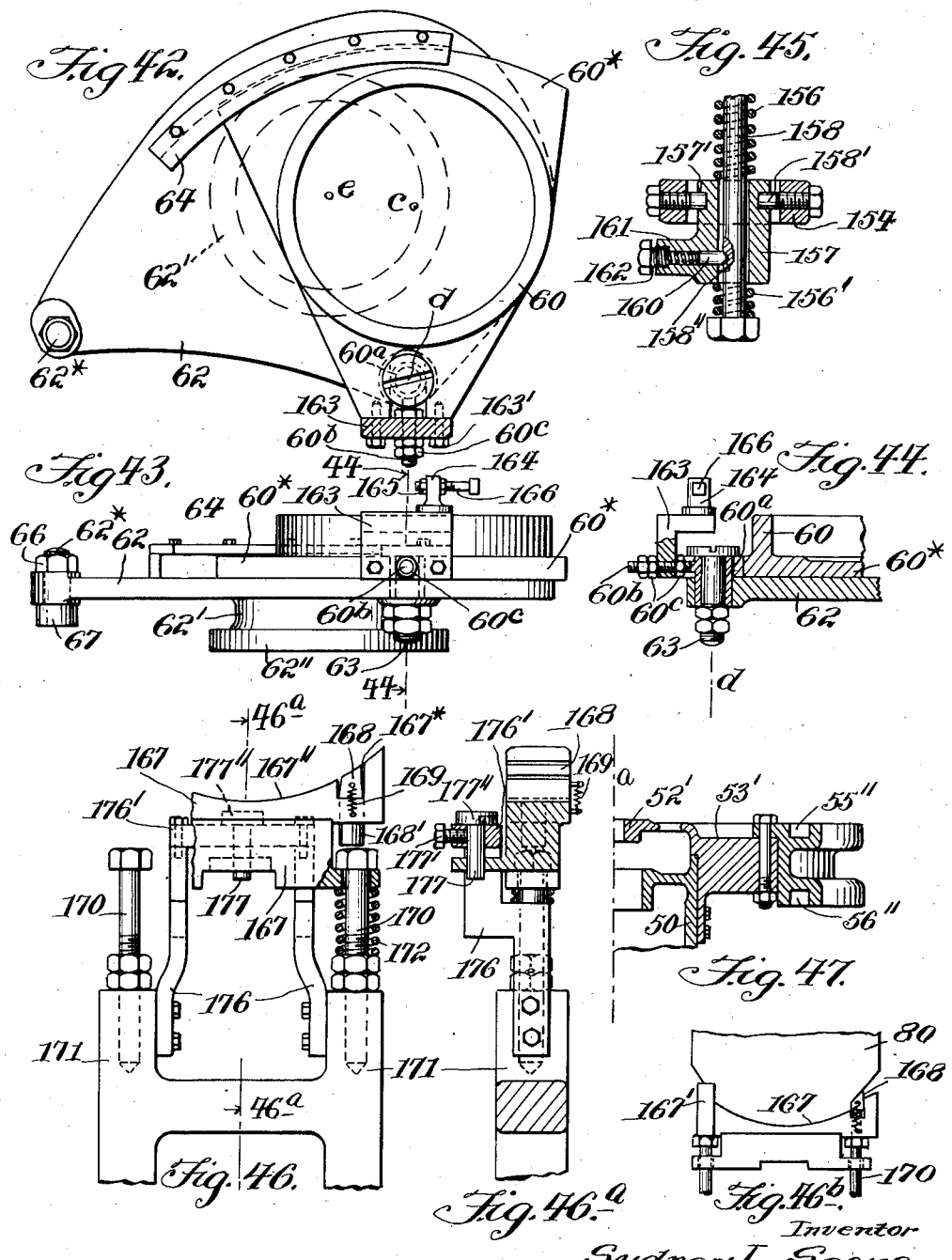

Patented Aug. 7, 1928.

1,679,502

UNITED STATES PATENT OFFICE.

SYDNEY L. SEARS, OF NORTH ARLINGTON, NEW JERSEY, ASSIGNOR, BY MESNE ASSIGNMENTS, TO HARTFORD-EMPIRE COMPANY, OF HARTFORD, CONNECTICUT, A CORPORATION OF DELAWARE.

BOTTLE-MAKING MACHINE.

Original application filed August 14, 1914, Serial No. 857,464. Renewed September 21, 1921, Serial No. 502,181. Divided and this application filed February 1, 1924. Serial No. 689,995.

My invention relates to machines for making bottles in suitable molds, chiefly by the action of compressed air, and has for its object to provide a machine of this character which will operate at a comparatively high rate of speed, which may be adapted readily to the manufacture of bottles of different sizes, and which will subject the material (glass) to the several operations in proper succession, carrying the material automatically from one step or stage to the next. Other features of my invention will be brought out in the description following hereinafter, and the novelty over the prior art will be pointed out in the appended claims.

Before explaining in detail the specific example of my invention illustrated by the accompanying drawings, I will give a brief outline of the steps or stages by the succession of which the original shapeless body of glass, or so-called "parison", is gradually transformed into a bottle of the desired shape.

The body of glass, or parison, is first brought into a blank mold which at that time is in an inverted position, with a neck mold at the bottom of said blank mold, and a nipple within the neck mold so that the glass flowing into the annular space between the neck mold and the nipple may begin to form the mouth and neck of the bottle. Pressure is then exerted on the parison from above (by compressed air) to drive the glass more thoroughly in the said annular neck space. Thereupon the nipple is withdrawn from the glass, and a rod or plunger contained within said nipple is driven upward into the parison to produce a cavity therein. After this piercing rod has been retracted downward, the parison is distended to a certain extent by blowing air through the nipple into the cavity formed by said rod. Then the blank mold, with the neck mold retaining its position relatively thereto, is inverted so that the neck mold will be at the top, and the blank mold is opened so that the partly-formed bottle will be suspended freely from the neck mold. A blow mold is then closed upon the partly-formed bottle, and by the action of compressed air the glass body is expanded further until its outer shape corresponds to the inner form of the blow mold. Then the neck mold opens to release the neck portion of the bottle, and the blow mold, still closed, with the bottle therein, is lowered to a position in which the bottle is finally released by the opening of the blow mold, so that the finished bottle may be removed.

Figure 49:
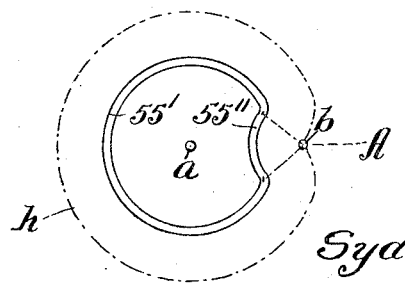
Figure 21:
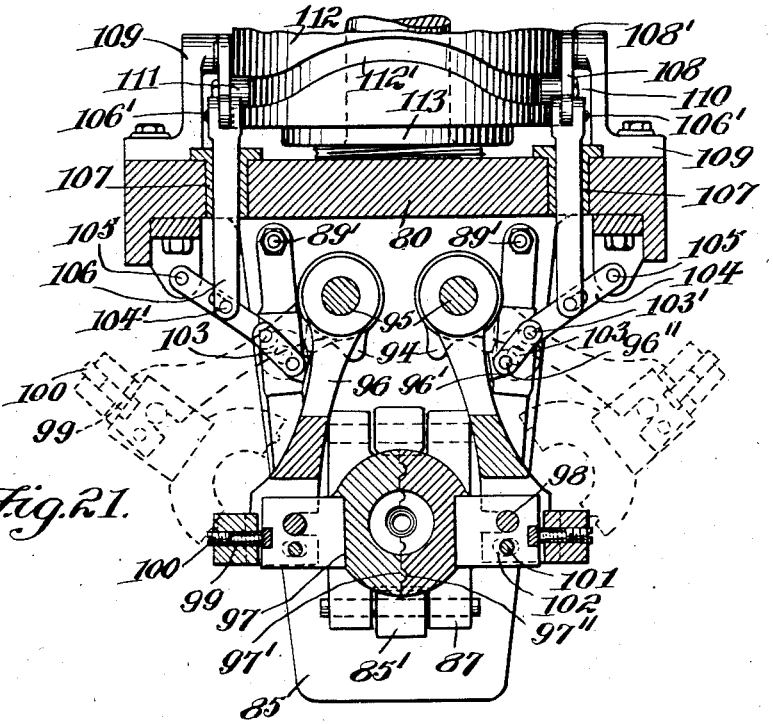
Figure 23:
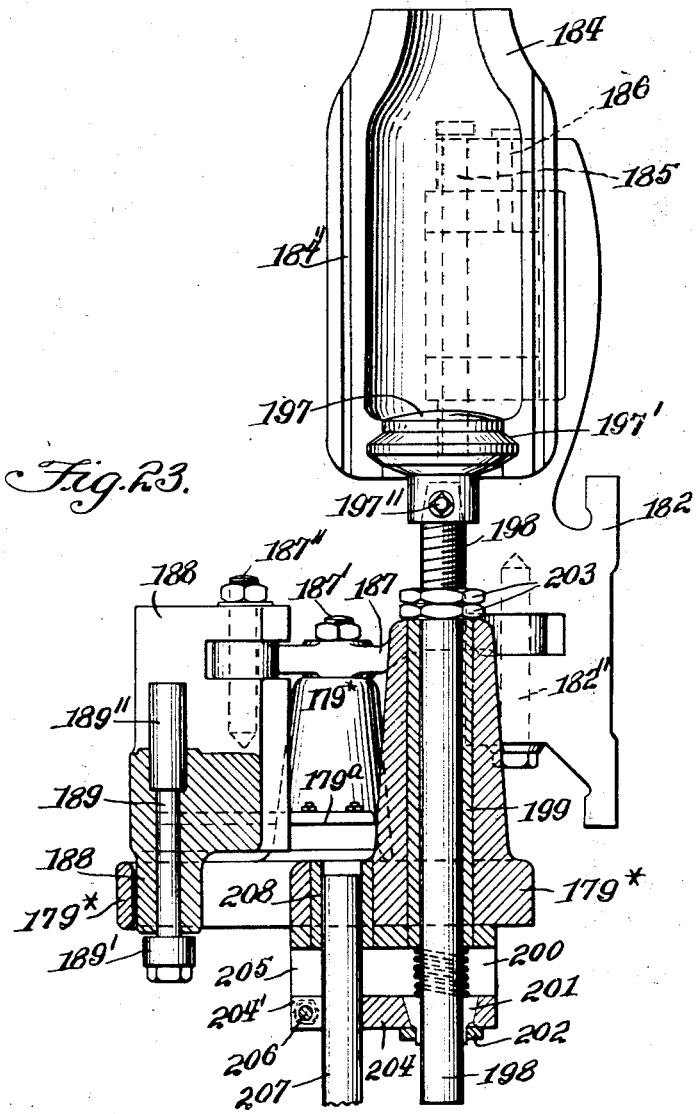
Figure 33:
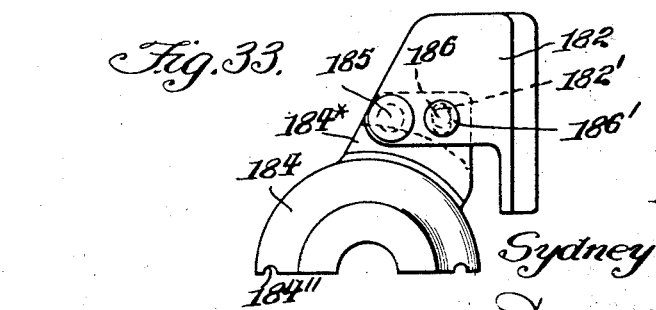
Figure 24:
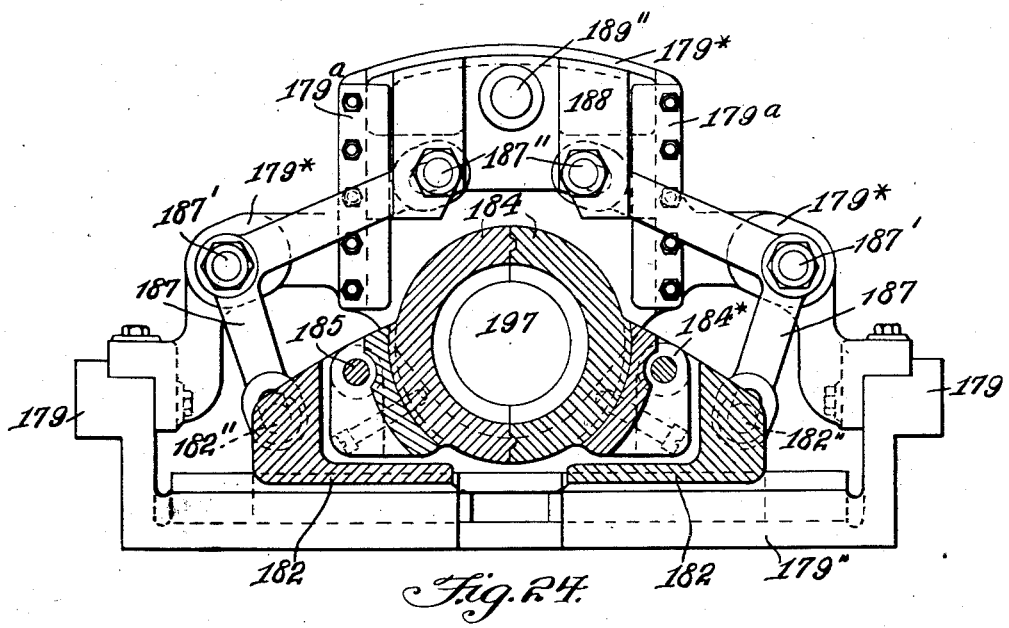
Figure 25:
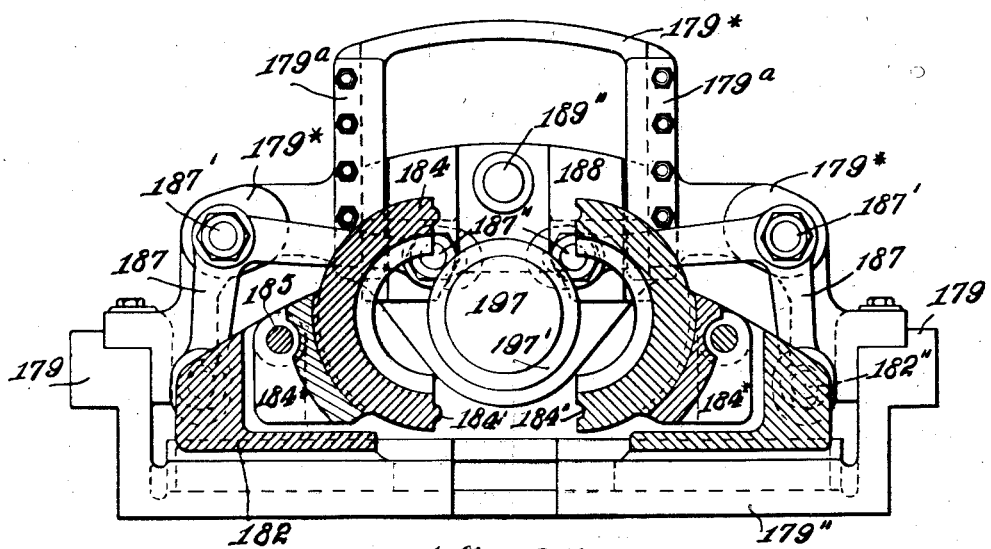

In the accompanying drawings, Fig. 1 is a plan view of a bottle-making machine embodying my invention; Fig. 2 is a partial cross section taken on line 2—2 of Fig. 1; Fig. 3 is an elevation of a portion of the machine; Fig. 4 is a partial plan view of certain parts connected with the blow mold mechanism; Fig. 5 is a plan view showing certain mechanism for temporarily supporting the bottle, and parts adjacent to said mechanism; Fig. 6 is a plan view, largely of a diagrammatic character, illustrating certain features in connection with the motion of the blank mold carrier; Fig. 7 is a sectional elevation of certain parts taken in the same plane as Fig. 2; Fig. 8 is a side elevation, and Fig. 9 a front elevation with parts in section, showing a mechanism for blowing compressed air into the inverted blank mold, from above; Fig. 9$^a$ is a partial vertical section of some of the parts shown in Fig. 9, but in a different position; Fig. 10 is a horizontal section on line 10—10 of Fig. 9; Fig. 11 is a horizontal section on line 11—11 of Fig. 12, the latter being a side elevation of part of the mechanism for operating the nipple, and Fig. 13 is a horizontal section on line 13—13 of Fig. 12; Fig. 14 is a side elevation of part of the mechanism for operating the piercing rod; Fig. 15 is a side elevation, Fig. 16 a vertical section on line 16—16 of Fig. 15, and Fig. 18 a top view of mechanism in connection with a cam for controlling the admission of air during the initial expansion of the parison; and Figs. 15$^a$, 16$^a$, and 18$^a$, are corresponding views of the cam mechanism for controlling the admission of air during the final blowing; Fig. 17 is a partial vertical section showing the blank mold and connected mechanism; Fig. 19 is a detail side elevation of gearing for turning the head, and Fig. 20 is a face view of a mutilated gear forming part of said gearing; Figs. 21 and 22 are top views of the blank mold mechanism, with parts in section, showing the same in different positions; Fig. 23 is a vertical section showing particularly the mechanism for operating the blow-mold bottom; Figs. 24 and 25 are plan views, with parts in section, showing the blow-mold mechanism in two different positions; Fig. 26 is a vertical section on the line 26—26 of Fig. 27, and the latter is a face view of a cam collar, on the plane and in the direction indicated by the line 27—27 of Fig. 26, these parts co-operating with the swinging head; Figs. 28 to 32 inclusive are diagrammatic developed views of various stationary cams for operating certain parts of the machine; Fig. 33 is a top view of one of the blow-mold sections and connected parts; Fig. 34 shows the blank mold in end view, together with the adjacent parts, the head being shown in section, Figs. 35, 35ª, and 35ᵇ are vertical sections of the blank mold and adjacent parts, illustrating the operations taking place in the blank-mold; Fig. 36 is a cross section on line 36—36 of Fig. 37, the latter being a longitudinal section of the nipple and adjacent parts; Fig. 38 is a side elevation illustrating the position of the parts during the blowing operation; Fig. 39 is a side elevation, with parts in section and others omitted, showing particularly the means co-operating with the swinging head to position and arrest it; Fig. 40 is a horizontal section showing part of the mechanism for turning and locking the cam collar 112 shown in Fig. 27, and Fig. 41 is a face view of a mutilated gear forming part of the mechanism for turning said cam collar; Fig. 42 is a top view of part of the mechanism for producing a peculiar novel movement of the carriage; Fig. 43 is a corresponding side elevation; Fig. 44 is a vertical section taken on line 44—44 of Fig. 43; Fig. 45 is a detail vertical section showing certain features of the parts appearing at the lower right-hand corner of Fig. 17; Fig. 46 is a front elevation, with parts broken off and others in section, showing details of the mechanism for arresting and locking the swinging head; Fig. 46ª is a vertical section on line 46ª—46ª of Fig. 46; Fig. 46ᵇ is a detail elevation showing the swinging head in engagement with its locking mechanism; Fig. 47 is a vertical section of the upper part of the frame with the carriage guides; Fig. 48 is a face view, and Fig. 48ª a side elevation, of a stationary cam for restoring to its normal position, the lever which controls the admission of air; and Fig. 49 is a diagrammatic plan view illustrating the peculiar motion which I give to the carriage.

The machine comprises a stationary central post or column 50 (made hollow so as to serve as a reservoir for compressed air supplied from any suitable source, as through a pipe 51), and to the upper part of the column 50 is secured a hub 52 from which extends outwardly a practically horizontal web 53 with a cylindrical vertical wall 54 at its outer edge. Radial ribs 53′ connect the hub 52, web 53, and outer wall 54. Exteriorly of said wall are two superposed horizontal flanges or rings 55, 56, each provided with a cam groove composed of a larger portion 55′ and 56′ respectively concentric with the axis $a$ of the column 50 (Fig. 2) and of a smaller portion 55″ and 56″ (Fig. 47) respectively curved according to the arc of a circle whose center or axis $b$ is at a greater distance from the axis $a$ than the main portions 55′ and 56′ of said cam grooves. Thus the cam groove portions 55′ and 56′ are convex when viewed from the outside, while the cam groove portions 55″ and 56″ are concave when viewed in the same way (Figs. 1 and 47). The cam portion 55′ is directly above the cam portion 56′, and the same thing is true with reference to the cam portions 55″ and 56″, that is to say, the points at which the cam portion 55′ joins the cam portion 55″, are exactly in line, vertically, with the points where the cam portion 56′ joins the cam portion 56″. All the parts described so far are stationary. The portion of the frame on which the concave cam portions 55″, 56″ are provided, is preferably a separate piece from the portion containing the convex cam portions 55′ and 56′.

*The carriage for the blank mold and neck mold.*

The cam grooves 55′, 55″ and 56′ 56″ form tracks for rollers 57, 58 arranged in superposed pairs (Fig. 2) and mounted to turn about vertical studs 57′ and 58′ respectively, the studs of superposed rollers being in vertical alinement. These studs are secured to a carriage 59; the machine shown has eight such carriages, all alike, so that it will suffice to describe one of them and its connections in detail. These carriages are spaced from each other evenly, that is to say, 45° apart in the machine shown. Each carriage 59 (see Figs. 2 and 7) is formed with a circular bottom flange 59′ and bearing disk 59″ capable of turning about its own vertical axis $c$, in a cylindrical box or socket 60 provided with a removable retaining ring 60′ and containing a bearing disk 60″ adjacent to the disk 59″, to form a step bearing in conjunction with balls 61 engaging both disks. The box 60 is rigid or integral with a plate 60* pivoted at 63 about a vertical axis $d$ (Figs. 42 to 44) to a plate 62 on which the plate 60* rests, and preferably a flange 64 (curved with the axis $d$ for its center) is secured to the plate 62, to guide the plate 60* at the portion farthest away from the pivot 63. The plate 62 is provided with a cylindrical downward extension 62' having a cylindrical bottom flange 62" capable of turning about its own vertical axis *e*, in a cylindrical box or socket 65 provided with a removable retaining ring 65' and containing a bearing washer 65" made of copper or other suitable anti-friction material. The plate 62 has a vertical pin 62*, extending through it, said pin having a threaded upper end to receive a nut 66, while on the lower end is rotatably mounted a roller 67 traveling in a cam groove 68, 68' in a guide 69 secured to the column 50 (Fig. 6). The cam groove portions 68, 68' correspond in location to the cam groove portions 55', 56' and 55", 56" respectively; the cam groove portion 68 forms an arc of a circle with the axis *a* as a center. The reentrant portion 68' may be considerably wider than the roller 67, except at one end, where as shown in Figs. 1 and 6, the groove has the same width as the circular arc portion 68, so as to guide the roller 67 on both sides.

The box 65 is rigid or integral with a table or carrier mounted to turn about the axis *a* of the column 50 and comprising an annular member 70 journaled on the lower portion of the said column (which is suitably lubricated), and a series of sectors 71 (eight in this case) rigidly secured to said annular member (Figs. 1 and 2). The carrier is supported by radial rollers 72 journaled in stationary bearings 73 and engaging a ring 74 at the bottom of the carrier. To this annular member 70 of the carrier is also secured a ring 75 provided with bevel teeth in mesh with those of a bevel wheel 76 which extends through an opening in the stationary base plate 77 and is secured to a radial drive shaft 78 journaled in stationary bearings 79. This shaft and the carrier actuated thereby, are rotated continuously while the machine is in operation.

*The swinging head carrying the blank mold and neck mold.*

On each of the carriages 59 (Figs. 2 and 7) is mounted to turn about a horizontal axis *f*, a head 80 provided with a horizontal journal 80' rotating in an externally tapered bushing 81 held rigidly in a suitable cavity of the carriage 59, by a screw cap 82. A bevel pinion 83 is held to rotate with the head 80, being secured to the journal 80', as by a nut 84 adapted to screw on a threaded portion of the journal and to press the said pinion against a shoulder 80" on the journal. The pinion 83 is in mesh with a bevel pinion 83' mounted on a shaft 83" disposed at an angle to the journal 80' (Fig. 19) and journaled in a bearing 83* secured to the carriage 59. To this shaft 83" is also secured a mutilated bevel wheel 83ª adapted to be engaged and rotated at certain points or stages, by stationary rack portions referred to hereinafter.

*The neck mold.*

The head 80 is made rigid or formed integral with a plate or support 85, which as shown in Fig. 17 may be slightly to one side of the axis *f*, and this support is provided with two lugs 85' through which extend parallel rods 86 secured rigidly to said lugs. On the portions of said rods which project on opposite sides of the lugs 85', are mounted to slide rectilinearly two neck mold carriers 87, to each of which is secured rigidly a neck mold section 88. Each of these sections is semi-circular in end view (Figs. 22 and 34), and one of them is preferably provided with longitudinal grooves 88' to receive corresponding ribs 88" on the other section, as to secure a close fit and a tight joint in the closed position. At its outer portion, each neck mold carrier 87 has a perforated projection 87' for connecting it pivotally with the outer end of an arm 89 fulcrumed on the support 85 at 89'. The carrier 87 is pressed toward its companion by a spring 90 one end of which engages the arm 89, while the other end bears against an adjustable screw 91 working in a bracket 92 secured to the support 85. By turning this screw 91, the tension of the spring 90 may be adjusted. Each arm 89 also carries a roller 93 adapted to be engaged by a cam 94 secured to a rock shaft 95 journaled in bearings 95' on the head 80 and support 85 respectively.

*The blank mold.*

To the shafts 95 are also secured rigidly arms 96 (Figs. 2, 17, 21 and 22) each of which, at its forked outer end, has a blank mold section 97 pivoted thereto at 98, and a spring 99 (whose tension may be regulated by turning a screw 100) tends to swing each section 97 on its pivot 98. This pivotal movement is only slight, being limited by a pin 101 carried by one of the parts (say, the blank mold section) and a slot 102 on the other part (say, the arm 96). The blank mold sections may be formed with ribs 97' and corresponding grooves 97", in the same way as described for the neck mold sections. The neck mold carriers 87 are formed with lips 87" adapted for dovetail engagement with corresponding projections 97* on the blank mold sections (Figs. 17 and 35). The axis *g* of the closed blank mold and neck mold is perpendicular to the axis *f* about which the head 80 swings, and parallel to the shafts 95, fulcrums 89', and pivots 98. The distance from said mold axis *g* to the axes of the rollers 57, 58, should be equal to, or approximate very closely, the mean radius of the cam portions 55'', 56'', or in other words, the distance from the axis or center $b$ to the center line of the said cam portions 55'', 56'' (Figs. 6 and 49).

*The mechanism for operating the blank mold and neck mold.*

Figure 22:
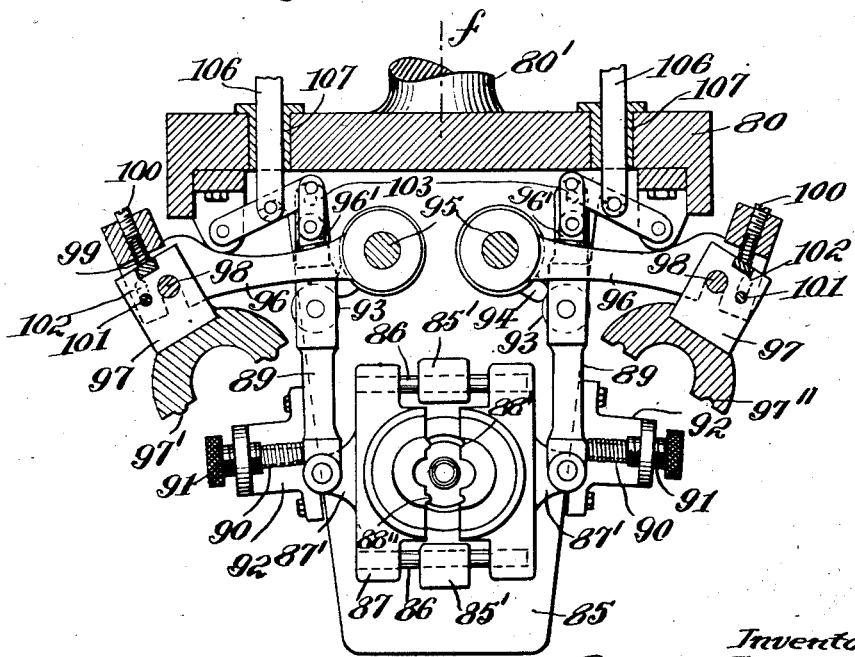

Each arm 96 is provided, at a distance from its fulcrum (the shaft 95), with a lug 96' pivotally connected at 96'' with one end of a link 103 the other end of which has a like connection at 103' with a lever 104 fulcrumed on the head 80 at 105 (Figs. 21 and 22). Each of the levers 104 is provided, between the points 103' and 105, with a pin-and-slot connection 104' to connect such lever with one end of a rod 106, mounted to slide in a suitable guide 107 secured to the head 80 and extending therethrough. The other end of the rod 106 is pivotally connected at 106' with a lever 108 fulcrumed at 108' upon a bracket 109 secured to the head 80 or forming part thereof (Figs. 2 and 21). Each lever 108 is provided, between the points 106' and 108', with a transverse pin 110 on which is mounted to turn a roller 111 arranged to travel in a cam groove 112' of a collar 112 screwed on a sleeve 113 mounted to turn on the carriage 59 about the axis $f$. A gear 114 secured rigidly to the cam collar 112 meshes with a corresponding gear, 115 mounted to turn on a stud 115' (Fig. 39), secured to the carriage (Figs. 39 and 40) the axis of the said stud being parallel to the axis $f$. Gear 115 also meshes with a pinion 116 secured to a short shaft 117 journaled in a bearing 59* forming part of the carriage 59, the axis of said shaft being radial, and therefore at an angle to the axis $f$ of the gear 114 (Figs. 39 and 40). At its inner end, said shaft carries a mutilated bevel pinion 118, (Figs. 40 and 41) adapted to mesh with stationary rack portions, as set forth hereinafter. A nut 119 (Fig. 7) screwing on the sleeve 113, serves to lock the cam collar 112 after it has been adjusted lengthwise of the sleeve 113 to the proper position. This longitudinal adjustment of the cam collar 112 enables me to properly set the mechanism which controls the opening and closing of the blank mold and neck mold. Of course, the gear 114, cam collar 112, and sleeve 113 are rigidly connected under normal conditions. A nut 120, screwed on the end of the journal 80' adjacent to the head 80, serves to confine the rotary sleeve 113 (Fig. 7). The two rollers 111 (Figs. 2 and 21) are in axial alinement, their axis being perpendicular both to the blank mold axis $g$ and to the axis $f$ about which the head 80 turns. The two fulcrums 108' are also in alinement, their axis being parallel to that of the rollers 111. The pivots 96'', 103', 104', and 105 are parallel to the blank mold axis $g$.

*Locking means, in connection with the cam collar 112.*

The gear 114 (rigid with the cam collar 112) is adapted to be engaged at times, by a toothed locking member 121 secured to a rod 121' which slides in guides 122 secured to the carriage 59, (Figs. 39 and 40). A spring 123 normally keeps the locking member 121 against the gear 114. The upper end of the rod 121' has a loose pivotal connection at 121'' with a crank arm 124' on a rock shaft 124 journaled in the carriage 59. The inner end of said rock shaft carries a crank arm 125 with a roller 126 adapted to be engaged by a stationary cam as set forth hereinafter. To one side of the toothed locking member 121 is secured rigidly a dog 127 adapted for locking engagement with recesses 112'' in the periphery of the cam collar 112 (Figs. 26 and 27).

For the purpose of locking the cam collar 112 to the head 80 at certain times, the following mechanism is provided: In the face of the cam collar 112 adjacent to the head 80 are provided recesses 112* (Fig. 17) adapted to be engaged by a locking bolt 128 mounted to slide (parallel to the axis $f$) in a guide 129 secured to the head 80, said bolt being pressed towards the cam collar 112 by a spring 130. The bolt 128 has a loose pivotal connection 128' with one end of an elbow lever 131 fulcrumed on the head 80 at 131', and having at its other end a loose pivotal connection 131'' with a short rod 132 mounted to slide in the head 80 in a direction parallel to the blank mold axis $g$. This rod is operated at times as explained hereinafter.

*The nipple and the parts carrying it.*

In the plate or support 85 is secured, as by a screw 133, a sleeve 134 having its upper end formed with an overhanging flange or lip (see Figs. 17 and 35) adapted to fit corresponding recesses in the neck mold carriers 87, when the neck mold is closed, and thus assisting in steadying the neck mold. Within the support 85 is also rigidly secured, as by a screw 135, another sleeve 136, extending partly within the sleeve 134, and provided at its upper end with an external screw-thread to receive a centrally perforated screw-cap 137 which serves to hold a centrally perforated guide 138 against said end of the sleeve 136. The opposite end of the sleeve 136 is chambered and provided with an internal screw-thread 136' in engagement with an externally threaded collar 139 secured rigidly to a barrel 140. The latter is mounted to slide and to turn in the sleeve 136, the axis of said barrel coinciding with the blank mold axis g. Adjacent to the screw-threaded collar 139, the barrel 140 is formed with a gear wheel 140' having teeth of considerable length, so that notwithstanding the longitudinal movement of the barrel, these teeth may remain in mesh with those of two pinions 141 (Figs. 11 and 17), mounted to turn on studs 141' carried by the support 85, on opposite sides of the gear wheel 140. Both pinions 141 are in mesh with a driving gear 142 mounted to turn on a stud 142' secured to the support 85. To the gear 142 is secured at 142'' an arm 143 adapted to engage one or the other of two stops 144 secured to the support 85, preferably in an adjustable manner, for which purpose said stops may be formed by alining screws passing through brackets 85'' and normally held stationary by means of nuts 144'. The gear 142 is also connected, pivotally, at 145', with a rod 145 the other end of which has a pivotal connection at 145'' with a lever 146 fulcrumed on the support 85 at 146' and carrying at its ends two rollers 147, 147' adapted to be engaged by stationary parts referred to hereinafter. The connection of the arm 143 and that of the rod 145 with the gear 142 are preferably adjustable circumferentially of said gear, for which purpose the gear may be provided with a segmental slot 142* in which the connecting pins 142'' and 145' may be secured at different points, as desired, by the action of nuts, or in any other approved manner.

To the end of the barrel 140 nearest the neck mold is secured (as by a screw connection) a nipple 148, (Figs. 17, 35, 36, 37) of a somewhat smaller diameter than said barrel, and mounted to slide in the guide 138 and to project between the neck mold section 88. The internal diameters of the nipple 148 and of the barrel 140 are preferably also different.

*The piercing rod and its connections.*

Within the barrel 140 and the nipple 148 is mounted to slide lengthwise a piercing rod or plunger 149, made in two portions whose diameters correspond to the internal diameters of the barrel and nipple respectively. Where the rod 149 passes out of the barrel 140, adjacent to the gear wheel 140', a tight joint is produced in any suitable manner, as by guiding said rod in a gland 150 which screws into an internal recess at that end of the barrel. The rod 149 is perforated lengthwise, as at 149', and its end adjacent to the nipple 148 is recessed axially and screw-threaded to receive a plug 151 having transverse channels 151' communicating with discharge ports 149'' in the surrounding wall of the tubular rod. The screw plug 151 also has a longitudinal channel 151'' communicating both with the channels 151' and with the longitudinal passage 149'. The outer ends of the channels 151' open into an annular chamber 148' formed by recessing the inner surface of the nipple 148. The tubular rod 149 is rigidly connected at the other end (preferably in an adjustable manner) as by set screw 152, (Fig. 17) with a head 149* pivotally connected, by means of alining transverse pins 153, with a forked lever 154 having an opening 154' for the passage of the head 149'' and adjacent parts, said lever being fulcrumed on the head 80 at 154''. The pins 153 are secured to the lever, and fit into an annular groove 149ᵃ of the head 149*, or any other suitable construction is adopted which will enable the head 149* to move in a straight line when the lever 154 swings on its fulcrum 154''. On the free end of said lever is mounted a roller 155 adapted for engagement with certain stationary operating parts, as set forth hereinafter. The lever 154 is held in its normal position by two coiled springs 156 and 156' whose adjacent ends engage opposite ends of a sleeve 157 mounted to slide lengthwise on a rod 158 secured to the support 85 (Figs. 17 and 45). The sleeve has an annular groove 157' engaged by the inner ends of transverse alining pins 158' secured to the lever 154; thus the sleeve 157 may move in a straight line when the lever 154 rocks on its fulcrum 154''. The rod 158 also forms a fulcrum for the lever 146 mentioned above, a nut 159 serving to hold the said lever and also as a bearing for one end of the spring 156. To hold the lever 154 steady in the normal position, the rod 158 has a tapered recess 158'' adapted to be engaged by the tapered end of a pin 160 held to slide transversely in the sleeve 157, under the influence of a spring 161. The outer end of the spring 161 is engaged by a screw-plug 162. This pin 160 does not positively lock the sleeve 157 and the lever 154 in their normal position, but simply holds them steady. (Fig. 45).

*Guiding and operating means in connection with the swinging head.*

To the plate 60* is secured a bracket 163 carrying a post 164 to which is secured adjustably, as by nuts 165, a horizontal pin 166 (Figs. 43, 44, 1 and 2) whose end is adapted to engage a suitable part of the head 80, say one of the nuts holding the bracket 109.

The head 80 is provided with two cylindrical braking surfaces 80ᵃ whose axis is at f, and at one end of each of the said braking surfaces is an angular stop shoulder 80ᵇ, (Figs. 3 and 46ᵇ) while at the other end is a rounded deflecting surface 80ᶜ. The shoulder 80ᵇ is adapted to be engaged by a stop 167' (Figs. 3, 39 and 46ᵇ) on a vertically movable slide 167 which also has a curved (cylindrical) surface 167'' of a proper shape to engage the braking surfaces 80ª. The slide 167 further has a recess 167* into which a projection 168 is normally withdrawn by a spring 169 (Figs. 3, 39 and 46). Said projection has a rounded side adapted to engage the deflecting surfaces 80ᶜ, and is movable vertically on the slide 167. The latter is guided upon vertical rods 170 secured to another slide 171, also movable vertically, and the slide 167 is normally kept against the heads at the upper ends of said rods, by means of springs 172 coiled on the rods. The slide 171 moves along laterally adjustable vertical guides 173 carried by a frame 174 secured to one of the sectors 71 forming part of the rotary table or carrier. The projection 168 has a stem 168' extending downwardly beyond the slide 167 and adapted to be carried up by the slide 171 when the latter moves up relatively to the slide 167 as described hereinafter. At its lower end the slide 171 carries a roller 175 (Figs. 2 and 39) in engagement with a stationary cam (referred to below) for governing the vertical movement of the slide 171 as the table or carrier rotates. The weight of the slide and of the parts connected therewith may be sufficient to keep the roller 175 against the said cam at all times; but if desired, the slide 171 may be urged downward constantly by a spring 171', one end of which is attached to the slide 171 and the other to a cross bar 174' forming part of the frame 174.

The slide 171 carries two brackets 176 (Figs. 46 and 46ª) connected by a cross bar 176' provided at its center with a socket in which a pin 177 is adjustable vertically, being held, after adjustment, by a set-screw 177'. The upper end or head 177'' of said pin is adapted to engage and operate the rod 132 (Figs. 2 and 17). The lower portion of the pin 177 is guided in a portion of the slide 167.

*The blow mold mechanism.*

Each of the sectors 71 is also provided with vertical guides 178 for a slide 179 carrying a roller 180 (Figs. 2, 3 and 38) in engagement with a suitable stationary cam (described below) to govern the up and down movement of the slide, the weight of the slide and of the parts connected therewith being sufficient to keep said roller against the cam. Preferably the roller is adjustable vertically, for which purpose said roller 180 may be journaled in a block 181 mounted to slide vertically in guides 179' and held in position, after adjustment, by set-screw 181'. A portion 179'' of the slide 179 extends outwardly and is provided in its interior with horizontal guideways for transversely movable slides 182 (Figs. 23, 24, 25 and 2). Preferably, at least one of the guideways is adjustable in and out, for which purpose I may provide a bar or gib 183, with screws 183' (Fig. 2) to adjust it relatively to the slide 179. Each of the slides 182 has a blow-mold section 184 pivoted thereto about a vertical axis 185 (Figs. 24 and 25), said sections preferably having ribs 184' and grooves 184'', of the same character as described with reference to the blank mold and neck mold. The drawings show the blow-mold sections provided with separate brackets 184* for connection with the pivots 185, (Fig. 33) but it will be obvious that these brackets might be integral with the blow-mold sections 184. The swinging movement of each section is limited, say by pins 186 held to swing with the respective mold sections and extending through short segmental slots 182' in the slides 182, said pins having heads 186' resting on the slides. These pins can be removed by simply pulling them out. Each of the slides 182 has a pin-and-slot connection at 182'' with one arm of an elbow lever 187 mounted to swing about a vertical fulcrum 187' on a bracket 179* rigidly secured to the slide 179. The other arms of the elbow levers have pin-and-slot connections 187'' with a slide 188 movable in guides 179ª carried by the bracket 179*. The slide 188 moves horizontally, but at right angles to the slides 182. Through the slide 188 extends a vertical pin 189 the lower end of which carries a roller 189' (Figs. 2 and 23) adapted to engage a stationary cam referred to below. The upper end 189'' of the pin 189 is enlarged and is adapted to enter, at times, an eye 190' on a slide 190 (Figs. 2, 4 and 7) movable in a radial guide 191 formed on the annular member 70 and the sector 71 of the rotary table or carrier. With the slide 190 is connected rigidly, but adjustably, another slide 192, as by means of a screw 193 having oppositely threaded portions, said second slide also moving in the guide 191. The same guide further receives a third slide 194 which is normally kept in contact with the slide 192 by springs 195. The inner end of the slide 194 has a pin or roller 196 engaging a stationary cam hereinafter referred to.

*The blow-mold bottom and its connections.*

The blow-mold sections 184 have their lower portions recessed or undercut, as shown best in Fig. 23, to fit corresponding flanges 197' on the mold bottoms 197, secured to rods 198 slidable vertically in bushings 199 which are secured rigidly in the respective slides 179*. Each mold bottom 197 is secured detachably to its rod 198, as by a set-screw 197''. The rod 198 is pressed downwardly by a coiled spring 200 the lower end of which engages a conical split collar 201 or other means clamped on the rod by a nut 202; the upper end of the spring engages the bushing 199, and the downward movement of the rod 198 is limited adjustably by nuts 203 secured on the threaded upper portion of the said rod. The conical collar 201 fits into a corresponding socket of a slide 204 movable vertically in a guide 205 secured rigidly to the slide 179*. The slide 204 has a split portion 204' in which is clamped, as by means of a screw 206, a vertical rod 207, the upper end of which is guided in a sleeve or bushing 208 secured to the slide 179*. The lower end of the rod 207 carries a roller 209 (Fig. 2) adapted to engage a stationary cam, as set forth hereinafter.

*Device for holding bottle during opening of blow mold.*

As one side of each sector 71 is pivoted to swing about a vertical axis 210', an arm 210 (Figs. 2 and 5) having a forked end 210" adapted to engage the neck of the finished bottle. At 211', the arm 210 is connected pivotally with an operating rod 211, mounted to slide horizontally in guides 65* secured to, or formed on, the box or socket 65. A coiled spring 212 tends to pull the rod 211 inward, this movement being limited by a stop 211" secured to the rod and adapted to engage one of the guides 65*. The inner end of the rod 211 carries a roller 213 adapted to engage a stationary cam, as described hereinafter.

*Air-supply connections.*

The connections for supplying air are as follows: As stated above, the hollow post or column 50 forms a reservoir for compressed air. At the top, the column 50 has a cover 50' recessed to receive a sleeve 214 formed with openings 214', 214" and a chamber 214* between them (see Fig. 2). Into the upper portion of the stationary sleeve 214 extends the lower end of the vertical rotary tube 215, journaled in a guide 52' secured to the hub 52. On the lower end of the tube 215 is secured a nut or collar 215' engaging a ring or bushing 216 whose upper end is beveled. This ring engages an expansible packing 217 on top of which is a bushing or gland 218 fitted into the sleeve 214 and having a beveled lower surface. A cover 219 threaded to screw on the outside of the sleeve 214 serves to adjust the gland 218 to compress the packing 217 and also serves as a further guide for the rotary tube 215. The upper end of this tube is formed with a distributing head 215" having as many radial sockets as there are carriages 59. Into each of these sockets screws the inner end of a radial tube 220 the outer portion of which may be guided in a hook 221 secured to the carriage 59. This hook may be swiveled about a vertical axis so as to follow the movement of the carriage when the latter takes the position shown at the right in Fig. 1. An elbow 222 secured to the end of the tube 220, is connected by a piece of flexible tubing 223, with a vertical tube 224 secured to the carriage 59 by brackets 59* (see Figs. 2 and 3). The lower end of the tube 224 is connected, by elbows 225 and straight pieces 225' as shown, with a tube 226 fitted axially into the enlarged inner end of the axial bore 80* of the journal 80' (Fig. 7). The tube 226 has a collar 226' engaging a shoulder of the bore 80* and engaged by a bushing 227. Another bushing or gland 228 projects beyond the inner end of the journal 80' and is engaged by a cap 229 screwing on said journal, to compress a packing 230 which is interposed between the beveled adjacent ends of the bushings 227 and 228. The axial bore 80* of the journal 80' connects with a radial bore 80$^d$ of the head 80, and from the outer end of said radial bore, a pipe 231 supported on the head 80 (as by a bracket 85* secured to the support 85) leads to one end of a piece of flexible tubing 232 the other end of which is connected, as shown in Fig. 17, with the longitudinal bore 149' of the piercing rod or plunger 149. A pressure gage 225* (Fig. 2) may be connected with the tubing 225, 225'. In the pipe 231, adjacent to its connection with the flexible hose or tubing 232, is located a spring-pressed valve 233, the stem 233' of which projects to the outside of the valve casing 233" and is engaged by one end of a lever 234 fulcrumed at 234' on a bracket 233* secured to the valve casing 233". The other end of the lever 234 is adapted to be engaged by the head of a set screw 235 carried adjustably by the lever 154.

*Blow head.*

At a suitable point, exteriorly of the path of the carriages 59 and the parts connected therewith, is located a stationary post 236 (Figs. 8, 9, 9$^a$ and 10) made hollow (in part) so as to form a reservoir to which compressed air is supplied through a pipe 237. The post 236 carries a horizontal guide 236' curved according to the arc of a circle whose center is on the axis $a$. On this guide is adapted to move circumferentially a slide, preferably composed of several sections 238, 238', 238", 238*, the lower section, 238, embracing the guide 236'. The sections are separable, being held together, say, by removable vertical bolts 239. By removing one of the intermediate sections 238', 238", and substituting, if desired, another section of different height, I can adjust the level of the upper section 238* and of the parts carried thereby. This upper section is formed with a sleeve 238$^a$ in which is contained a spring 240 surrounding a valve casing 241 mounted to slide vertically in said sleeve; a screw 242, screwed into the sleeve, and engaging a vertical groove in the valve casing 241, may be employed to prevent the latter from turning while allowing it to slide. The casing 241 has an outlet 241' at the bottom, and adjacent thereto a seat for a ball valve 243, pressed down by a spring 243' the upper end of which bears against a plug 244 screwed into the upper part of the valve casing 241. The upper end of the spring 240 bears against a cap 245 mounted to slide in the sleeve 238ª and connected with the valve casing 241, as by a pin 246. The cap 245 carries a roller 247 in engagement with a stationary cam 248 carried by a bracket 236ª screwed to the upper end of the post 236. The cam is preferably removable, so that cams of different shapes may be substituted, and comprises two horizontal surfaces 248', 248'' at different levels, and an inclined surface 248* connecting them. Air is supplied to the interior of the valve casing 241 through a short tube 241'' and through flexible tubing 249 connecting this tube with the reservoir formed in the post 236. Upon the lower end of the valve casing 241 is fitted to slide vertically a sleeve 250 to which is secured a head 251 adapted to engage tightly the upper end of the blank mold, under conditions set forth hereinafter. This head is dished or recessed on its lower surface, and has perforations 251' through which air may pass to said recess from the outlet 241' when the valve 243 is open. The sleeve 250 has a shoulder 250' normally resting on a corresponding shoulder of the valve casing 241, and the head 251 is in the path of the said casing. The head 251 also carries an axial pin 252 adapted to unseat the valve 243 at certain times. Normally, the pressure of the spring 243' not only seats the valve, but also projects the head 251 and sleeve 250 downwardly from the valve casing 241, as shown in Fig. 9.

*Cams for operating the several mechanisms.*

The slide 238, 238', 238'', 238* carrying the parts just described is adapted to be moved lengthwise of the guide 236', by the following mechanism: A dog 253 is pivoted to the slide section 238 to swing about a vertical axis 253', a spring 254 pressing the roller 255 (at one end of said dog) against a cam 236'', 236* formed on the stationary guide 236'. The other end of the dog 253 is adapted to be engaged by a lug 85ª secured to the support 85. A spring 256 secured to the slide section 238 and to the guide 236', tends to return said slide to its normal position, against stationary buffers 257.

A stationary bracket 258 (Figs. 1, 11, 12 and 13) carries a cam 259 adapted to engage the roller 147 carried by one end of the lever 146. Preferably the cam 259 is adjustable, as by mounting it to swing about a vertical axis 259' on a cam guide 260 rigidly secured to the bracket 258 (by a screw 261).

At its other end, the cam has a pin-and-slot connection 259'' with a head 262' at the end of a screw 262 fitting an internal thread of a sleeve 263. This sleeve is mounted to turn in the bracket 258 and guide 260, but is held against longitudinal movement, as by a collar 264 and a nut 265. By turning the hand wheel 263' carried by the sleeve 263, the cam 259 can be adjusted in or out.

Another stationary cam 266 (Figs. 1 and 14) is adapted to engage (from below) the roller 155 on the lever 154. Adjacent to said cam is a stop 267 also adapted to engage said roller.

Another stationary support 268 carries downwardly extending vertical pins 269 forming guides for a vertically adjustable cam 270 (Figs. 1, 15, 16 and 18) adapted to engage the roller 155 from above. Vertical screws 271 are provided with threads of opposite directions fitted into the support 268 and the cam 270 respectively, so that by turning the said screws, the cam will be moved toward or from the support. For this purpose, the central portions of the screws 271 may carry sprockets 272 in engagement with a chain 273 also engaged by a sprocket 274 on a shaft 275 journaled in a slide 276. This slide moves horizontally on a guide 277 forming part of the support 268, and is adjusted by means of a screw 278 provided with a hand wheel 279 and screwing into the slide 276, the inner end of the screw engaging the guide 277. It will be obvious that the chain 273 may be tightened by operating the hand wheel 279, while turning the hand wheel 280 on the shaft 275 will adjust the cam 270. A nut 281 provided with a handle 282, serves to lock the shaft 275 against turning, so as to hold the cam 270 in the adjusted position.

I prefer to make the cam just described, in a plurality of sections; thus, Fig. 1 shows another, independent cam section 270' immediately adjacent to, and in the continuation of, the cam or cam section 270. The mechanism for adjusting the cam section 270' will be of the same construction as that for adjusting the cam section 270, as will be evident from the drawing.

At another point of the periphery of the machine is located a series of similar cams 270'' adapted to engage the roller 155 from below (Figs. 1, 15ª, 16ª, 18ª). The construction and arrangement are substantially the same as described with reference to the cam 270, but each cam 270'' is located above its support 268'' instead of below, with a corresponding re-arrangement of the operating mechanism. Corresponding parts are indicated by similar reference characters. The drawing shows thirteen cams 270'' adjustable independently of each other and arranged end to end although this particular arrangement is not essential.

A stationary converging guide 283 (Figs. 48 and 48ª) is adapted to engage the roller 155 after it has left the last cam 270″ to insure bringing the said roller back to its normal position. At the same point of the machine's periphery is located a cam 259* (Fig. 1) adapted to engage the roller 147′ on the lever 146. This cam is supported and adjusted in exactly the same manner as the cam 259, so that a detailed description will not be necessary.

Fig. 28 shows certain cams located on the flange 55, the vertical wall 54, and the web 53. On the lower side of the flange 55 is secured a cam or guide 284 adapted to engage from above, the flat surfaces or interruptions of the mutilated gear 118. Then follows, after a gap 285, another cam or guide 286 also adapted to engage the flat surface of said mutilated gear. In this latter guide are set, at two successive points, rack portions 287, 287′ adapted to engage the teeth of the said mutilated gear. Then follows another gap 288, and a short guide 289, adapted for engagement with the flat surface of the mutilated gear. The vertical wall 54 carries a cam 290 adapted to engage the roller 126 from below. The cam 290 has a drop 290′ at its central portion. The roller 126 is also adapted to engage a pair of cams 291, 291′, separated by a gap 291″, and carried by the vertical wall 54. On the lower face of the web 53 is a segmental guide 292, in which rack portions 293, 293′ are inserted at a distance from each other, said rack portions being adapted for engagement with the teeth of the mutilated pinion 83ª, while the main portion of the guide is adapted to engage the flat surfaces or interruptions of said pinion. All the parts shown in Fig. 28 are along that portion of the wall 54 which is concentric to the axis $a$ of the machine; that is to say, Fig. 28 omits that portion of the wall 54 which is reentrant and has the axis $b$ for its center.

Fig. 29 shows a cam 294 which controls the position of the slide 171 by engaging the roller 175 (Figs. 2, 3, and 39). This cam 294 is secured to the stationary base plate 77 at the lower portion of the machine. The cam 294 has a rise 294′, then follows a gap 294″, thereupon a partial rise 294* followed by a rise 294ª to the same level as the rise 294′; then comes another gap 294ᵇ, followed by a partial rise 294ᶜ to the same level as the portion 294*, and a rise 294ᵈ to the same level as the portions 294′ and 294ª. There is a gap (as Fig. 29 shows) between the cam portions 294ᵈ and 294′.

The cam 295 shown in Fig. 30 is adapted to govern the vertical motion of the blow-mold by engaging the roller 180, (Figs. 2, 3 and 38) and the cam 296 shown in the same figure governs the vertical movement of the blow-mold bottom 197 by engaging the roller 209 (Fig. 2). The cam 295, secured to the base plate 77, has an incline 295′ followed by a horizontal raised portion 295″ and an incline 295* ranging in the opposite direction to the incline 295′. The inclined cam 296 is arranged adjacent to the junction of the cam portions 295′, 295″, and may be secured to the inner side of the cam 295.

The cams 297 and 298 shown in Figs. 31 and 32 (and also in Figs. 2 and 4) serve to open the blow-mold and to close it partially, said cams being adapted to engage the roller 189′ (Figs. 2 and 23). These cams are carried by posts 297′, 298′ respectively, secured to the base plate 77. The cams 297, 298 are both horizontal, but inclined in opposite directions relatively to radial planes, as shown in Fig. 32, and the cam 298 is shorter than the cam 297 but projects outwardly a little farther than said cam 297.

The roller 196 travels in a groove 299′ provided in a ring 299 (Figs. 2, 4 and 7) secured to the post 50. The main portion of the groove is concentric with the post, but at one point the groove has a cam portion 299″ at a greater distance from the center or axis $a$ than the main portion of the groove.

On the upper surface of the ring 299 is secured a cam 300 adapted to engage the roller 213 (Figs. 2 and 5).

Before describing in detail the operation whereby the parison is transformed into a bottle, I will first call attention to the peculiar path which the neck mold and blank mold follow in their movement. This is illustrated in Fig. 49, which is a diagram showing the upper groove or track 55′, 55″ for guiding the carriage 59, the axis $a$ forming the center of the track portion 55′, the axis $b$ forming the center of the track portion 55″, and the track or path $h$ followed by the axis $g$ of the neck mold and blank mold. It will be understood that the shaft 78 is rotated continuously (at a uniform rate of speed) imparting a like motion to the carrier 70, 71, 74, 75 and causes the carriage 59 to travel around with said carrier. As long as the rollers 57, 58 run in the groove portions 55′, 56′ respectively, the carriage 59 and all parts connected therewith, including the neck mold and blank mold, will travel in a path which is an arc of a circle having $a$ for its center. When, however the leading rollers 57, 58 reach the track portions 55″, 56″ respectively, the further movement of the carrier 70, 71, 74, 75 will cause the carriage 59 to be swung quickly in such a manner as to bring the mold axis $g$ to the point $b$ which is the center of the track arc 55″ (56″). Then, as the carriage 59 continues to move with both rollers 57 in engagement with the track portion 55″, and both rollers 58 in engagement with the track portion 56″, the said carriage temporarily swings about $b$ as its axis, and since the distance at which the neck mold and blank mold are from the said rollers (measured horizontally) is equal or approximately equal to the radius of the track portions 55″, 56″, it follows that the neck mold and the blank mold will during this period remain practically stationary (their only movement being a slight swinging about their axis $g$, which at this moment coincides with the axis or center $b$); the carriage 59 and the carrier 70, 71, 74, 75 however continue to travel. It will be evident that this temporary stoppage or "dwell" of the neck mold and blank mold affords an excellent opportunity for filling the mold with glass, while the fact that the carrier continues to move not only simplifies the machine by doing away with the necessity of employing an intermittent-motion mechanism, but also enables me to run the machine with less power than if it had to be stopped and started repeatedly. In view of their functions just pointed out, I term the arcs 55′, 56′, the main travel portion of the track, and the arcs 55″, 56″, the dwell portion of the track.

In the detailed description of the operation now to be given, I have used capital letters A, B, C etc. to indicate the order in which the several operations follow each other in a particular case, it being understood that certain departures from this particular sequence may be allowable, as will be explained at the end of the description. On the drawings, the same letters A, B, C etc. have been applied to indicate the portions of the machine at which the respective operations are to take place.

Beginning with that period in the operation of the machine when the axes $b$ and $g$ are co-incident for a certain length of time as described above, that is to say, when the neck mold and blank mold are practically stationary notwithstanding the continuous motion of the carriage 59 and of the carrier 70, 71, 74, 75, glass is filled into the inverted blank mold and neck mold in any suitable manner at the point marked A in Figs. 1 and 49. The condition of the blank mold and neck mold at that time is as shown in Figs. 17 and 21. The nipple 148 is in its upper position, projecting into the neck mold 88, so that the glass poured in at the top will flow around the nipple, to begin the formation of the bottle neck, as will be understood by reference to Fig. 17. As the carriage 59 continues to travel along the "dwell" portion 55″, 56″ of the track, the leading rollers 57, 58 will enter the main travel portion 55′, 56′ of the track. The mold, which until then has been stationery at the point A, begins to swing so that its axis $g$, traveling on the path $h$ shown in Fig. 49, quickly moves to that portion of said path which is concentric with the axis $a$.

By the time both pairs of rollers 57, 58, have entered the main travel portion 55″, to 56″ of the track, the mold axis $g$ has reached the beginning of that portion of the path $h$ which is concentric with the axis $a$.

The peculiar movement of the carriage 59, produced by the continuous motion of the carrier 70, 71, 74, 75, and by the guiding effect of the track 55′, 56′, 55″, 56″ on the rollers 57, 58, assisted by the guiding effect of the cam groove 68, 68′ on the roller 67, will be understood best by reference to Figs. 2, 6, and 7. Fig. 6 shows in diagrammatic fashion, four successive positions of certain parts connected with the carriage 59. At the top of said figure, both rollers 57 are in the main travel portion 55′ of the track 55′, 55″, and the roller 67 is in the portion 68 of the cam groove 68, 68′. In the next position shown, the rollers 57 have entered the "dwell" portion 55″ of the track, and follow a path in the form of an arc of a circle having its center at $b$. The part of socket 65, being rigid with the carrier, will travel in such a manner that its center or axis $e$ will remain at a constant distance from the axis $a$ of the machine. On the other hand, the body of the carriage 59, with its bottom flange 59′, owing to the engagement of the rollers 57, 58 with the track 55′, 55″, 56′, 56″, is compelled to travel in such a manner that the center or axis $c$ of the bottom flange 59′ will travel in a path parallel to the track, as indicated by the dotted line shown in Fig. 6 at the center of the track groove 55′, 55″. In order that these motions may take place simultaneously, I have provided the pivot joint 63 (Figs. 2, 6, 42 to 44) at $d$ to connect the plate 62 with the plate 60* and its box 60. The bottom flange 59′ can turn relatively to the box 60 about the axis $c$, the box 60 and the plate 62 with its downward extension 62′ can turn relatively to each other about the pivot $d$, and the downward extension 62′ of the plate 62 can turn relatively to the box 65 about the axis $e$. It follows that the distance between the axis $c$ and the pivot $d$ will always be the same, and the distance between the pivot $d$ and the axis $e$ will also be constant, but the position of the pivot $d$ relatively to the path of $c$ will vary, as will also the distance between the axes $c$ and $e$, resulting in the peculiar motion shown in Fig. 6. The carrier 70, 71, 74, 75, as it rotates, pulls the plate 62 with it, exerting a pull on the pivot 63, so as to cause the plate 60* to follow this movement, and the plate 60* in turn takes the carriage 59 with it. The plate 62 is restrained from turning about the axis $e$, except as desired, by the guiding action of the cam groove 68 on the roller 67; but for these parts, there would be nothing to prevent the plate 62 from swinging around the box 65, so that the position of the pivot 63 (d) would be uncertain, instead of being positively controlled as long as the roller 67 is in the groove portion 68. When the roller 67 reaches the wider cam groove portion 68', the plate 62 is no longer guided positively at the end carrying the roller 67. At the time when the roller 67 is traveling in the cam groove portion 68', the pin 166 carried by the upper plate 60* comes in engagement with a portion of the head 80, so that said plate is arrested, or rather retarded, causing the plate 60* to swing on the pivot 63 (axis d) clockwise, while at the same time the lower plate 62 swings clockwise about the axis e, whereby the roller 67 is brought to the entrance end of the main travel portion 68 of the cam groove 68, 68', this being the position shown at the bottom in Fig. 6. The purpose of the arrangement just described (with the plate 60* held back, as it were, by the engagement of the pin 166 with the head 80), is to prevent such a relative motion of the plates 60*, 62 as would carry the upper plate materially beyond the edge of the lower plate, in which case the upper plate would not be properly supported; Fig. 6 shows clearly that in every position, the plate 60*, or at least its major portion, is immediately above the plate 62 and amply supported thereby. Another purpose of the engagement of the pin 166 with the head 80 is to swing the lower plate 62, as set forth above, to bring the roller 67 into the proper position for the continued movement.

Immediately after both rollers 57 and both rollers 58 have again entered the main travel portion 55' and 56' of the track, air is blown into the upper end of the inverted mold, at the point B, in the following manner (see particularly Figs. 8, 9, 9ª, and 10): The lug 85ª on the support 85 comes in engagement with the projecting end of the dog 253, so that during the further movement of said support 85 the slide 238, 238', 238", 238* will be carried along by the support 85, said slide moving on the guide 236'. The head 251 of the valve casing 241 carried by said slide, is immediately above the upper end of the inverted blank mold 97. During the movement of the slide toward the left (Figs. 9 and 10), the roller 247 moves along the stationary cam 248. When the said roller comes in contact with the inclined surface 248* of said cam, this causes a downward movement of the cap 245, valve casing 241, sleeve 250, and head 251, causing the latter to be pressed tightly against the upper end of the inverted blank mold 97. From this point on, the downward movement of the head 251 and of the sleeve 250 is arrested, but the cap 245 and valve casing 241 continue to move downward (against the tension of the spring 240) until the roller 247 reaches the horizontal portion 248" of the cam 248.

The downward movement of the valve casing 241 relatively to the head 251 causes the ball valve 243 to be raised off its seat in the casing 241, by the pin 252 of the head 251 Fig. 9ª. As soon as the valve is unseated, air from the connection 249 and from the valve casing 241 passes through the outlet 241' and through the perforations 251' into the upper portion of the blank mold 97; the glass contained in the blank mold and neck mold is thus pressed downward forcibly, so as to make it fill completely, the neck mold and the lower portion of the blank mold, whereby the neck portion of the bottle especially is properly formed around the nipple 148. As the movement of the slide 238, 238', 238", 238* toward the left continues, the roller 255, which so far has traveled along the cam portion 236", comes in contact with the inclined cam portion 236*, thus swinging the dog 253 on its pivot 253' in such a manner as to withdraw the other end of the dog from the path of the lug 85ª. This releases the slide from the support 85, and the spring 256, which has been placed under increased tension as the slide moved toward the left, now pulls the slide back to its normal position, against the buffers 257. At the same time, the springs 243' and 240 restore the other parts to the position shown in Figs. 8 and 9.

At the point marked C, the cam 259 comes in engagement with the roller 147, swinging the lever 146 on its fulcrum 146' and through the medium of the rod 145 swinging the gear 142 until the arm 143 engages the stop 144 shown at the left in Fig. 11. The rotation of the gear 142 is transmitted by the pinions 141 and the gear wheel 140' to the barrel 140 and the nipple 148. Since the collar 139 is compelled to rotate with the barrel 140, (Figs. 17 and 35) said collar which engages the screw-threaded portion 136' of the sleeve 136, will cause the nipple 148 to move lengthwise at the same time that it rotates. At the point C, the rotation will be in such a direction as to cause the nipple 148 to be withdrawn from the partly formed bottle neck, to the position shown in Fig. 35. The fact that the nipple rotates at the time of its longitudinal withdrawal, assists in producing a smooth surface on the inside of the bottle neck. This step in the operation will be understood best by reference to Figs. 1, 11, 12, 13, and 35. The roller 147 and the parts operated thereby as above described, remain in the shifted position until brought back to their former position by the action of the cam 259*, as described hereinafter.

At the point D, the roller 155, Fig. 17 engages the cam 266 (Figs. 1 and 14), so that the lever 154 is swung upward on its pivot 154", whereby the rod 149 is carried to the upper position. The rod thus enlarges the cavity formed in the parison, as will be understood by comparing Fig. 35 with Fig. 35ª. When the roller 155 reaches the end of the cam 266 (see the position indicated in dotted lines in Fig. 14), the roller will drop off the cam 266 under the influence of the spring 156. The stop 267 will prevent the roller 155 from going down beyond its normal position, since this would open prematurely the valve which admits compressed air into the blank mold through the nipple. The parts now occupy the position shown in Figs. 35, 36, 37.

At the next point, E, the roller 155 is engaged from above by the cam 270, Figs. 1, 42, 43, 44 so as to depress the lever 154 below its normal position. This depresses the right-hand end of the lever 234 (Fig. 17) so that the left-hand end of said lever will move upward to open the valve 233. Compressed air from the pipe 231 will then pass to the flexible hose 232 and to the longitudinal bore 149' of the piercing rod 149 (Figs. 35, 36 and 37). At the upper end of said rod the air will escape through the channels 151'' and 151' of the screw plug 151 and the ports 149'' into the annular chamber 148'. The upper end of the plunger or rod 149 is of a slightly smaller diameter than the opening at the end of the nipple 148, so that the compressed air can pass out of the chamber 148' into the parison in the shape of a thin annular film or jet. Such an annular jet is very efficient, and moreover the danger of clogging the annular opening through which the air is discharged, is very slight, especially in view of the cleaning action resulting at said opening from the up-and-down movement of the rod 149 and the up-and-down and rotary movement of the nipple 148. The preliminary blowing obtained at this point enlarges the cavity produced by the rod 149 as shown in Fig. 35, and begins to distend the parison. By making the cam which controls the admission of air to the blank mold, in a plurality of sections, as 270, 270', I am enabled to vary the blowing action in different ways; thus either the cam section 270 or the cam section 270' may be thrown out of action by adjusting it so that the roller 155 will not engage it, so that air will be admitted by the action of one cam section only; or the cam sections may be so adjusted that the roller 155 will engage both of them, thereby prolonging the time during which air will be admitted. Further, by using one adjustment for one cam section, and a different adjustment for the other cam section, I may cause the valve 233 to be opened to a greater extent while the roller 155 engages one cam section and to a smaller extent while said roller is in engagement with the other cam section.

At the point F, the head 80 is positioned or indexed by the following mechanism shown particularly in Figs. 2, 3, 29, 39, 46 and 46ª: The roller 175 carried by the slide 171 rides on the cam 294. The roller and slide are in their lowermost position, with the roller against the cam portion 294º, while the carriage 59 is traveling along the dwell portion 55'', 56'' of the track. After the carriage has reached the main travel portion 55', 56' of the track, the roller 175 comes in engagement with a cam portion 294ᵗ, whereby the slide 171 is raised from the position shown in Fig. 39. At the point F, the roller 175 comes in engagement with the cam portion 294' which causes the slide 171 to be raised further. During the first part of this movement, the slides 171 and 167 together with the projection 168 move upward in unison, that is to say, without changing their relative positions. Then the curved surface 167'' of the slide 167 comes in engagement with the surface 80ª of the head 80. The upward movement of the slide 167 being thus arrested, the further movement of the roller 175 along the cam portion 294' will cause the head of one of the rods 170 to engage the stem 168' of the projection 168 so as to raise said projection relatively to the slide 167 and to properly position or index the head 80 as shown in Fig. 46ᵇ. Immediately after this indexing, the head 80 is released by the roller 175 sliding down the incline at the right-hand end of the cam 294 (Fig. 29), to reach the cam portion 294''', which brings the slides 167 and 171 back to the position shown in Fig. 39, so that the head is free for the turning or inverting operation to be described presently, or at least is not held by the slide 167.

Up to this point, the head 80 has been held against turning around its axis by the toothed locking member 121, this latter locking the collar 112 and gear 114, and the collar 112 and gear 114 being locked to the head by the bolt 128 (Fig. 17). At the point F or thereabouts the roller 126 will be engaged by the cam 290 (Figs. 2, 3, 28, 39 and 40), thus raising the toothed locking member 121 from the gear 114 and cam 112, so as to release such collar and gear and also the head 80 which remains locked to the collar by the bolt 128.

Next follows the reversal or inversion of the head 80 and the parts carried thereby, so that the neck mold 88 will be above the blank mold 97. This operation, which takes place at the point G will be best understood by reference to Figs. 1, 2, 19, 20, 28 and 39. The mutilated gear 83ª, the upper (horizontal) flat surface of which has traveled in engagement with the guide 292, will come in engagement with the rack portion 293, thereby turning said gear and the pinions 83', 83 with the journal 80' and the head 80, giving the latter a half revolution about its axis $f$ so that the neck portion of the partly formed bottle will be uppermost. Otherwise, the relative position of the parts carried by the head 80 remains the same.

While the head 80 is swinging as just described, and toward the end of such swinging movement, the roller 175 by riding up the incline 294* (Fig. 29) will be raised sufficiently to bring the curved surface 167" of the slide 167 against the surface 88ª on the head 80. The friction between these two curved surfaces (which is increased by the pressure of the springs 172) will check the momentum of the swinging head so as to reduce the danger of breaking off the projection 167' when the shoulder 80ᵇ of the head finally strikes against it. During the operation just described, which takes place at the point H, the projection 168 is not raised relatively to the slide 167, but, under the influence of the spring 169, remains in the position shown in Fig. 46. After the head 80 has come to a stop, due to the braking action of the two curved surfaces 167" and 80ª against each other and to the projection 167', the roller 175 will ride up the incline 294ª (Fig. 29), thus raising the projection 168 relatively to the slide 167 and properly positioning or indexing the head, as described above. The slide 167 with its projection 168 will now remain in its upper position shown in Fig. 46ᵇ, thus steadying the head for the succeeding operations.

As explained above, the head 80 during the swinging or reversing operation, is locked to the collar 112 and gear 114 by means of the bolt 128. The gear 114 will thus make one-half revolution with the head; the gear 115 being in engagement with the gear 114 will turn also and will cause the mutilated bevel pinion 118 to revolve around its axis, this bevel pinion being connected with the gear 115 by means of the short shaft 117 and the pinion 116. In order to allow the bevel pinion 118 to turn freely at this time, I have provided the gap 285 in the cam or guide 284 which up to this point has been in engagement with one of the flat surfaces of the mutilated bevel pinion 118.

At the end of the swinging or reversing movement of the head 80 the rod 132 (Figs. 2 and 17) carried by said head will be engaged by the upper end of head 177" of the pin 177. This engagement will cause the rod 132 to be raised: the elbow lever 131 will swing around its fulcrum 131' and push the bolt 128 against the tension of the spring 130 until this bolt is out of engagement with the recess 112* on the collar 112. The head 80 will thus be unlocked from the collar 112 and gear 114, that is to say, the collar and gear will be free to turn independently of the head. The toothed locking member 121, which had been raised so as to allow the gear 114 and collar 112 to turn with the head, will now again engage the gear 114, this being due to the action of the spring 123, the roller 126 at this point engaging the drop 290' of the cam 290 (Fig. 28).

As soon as the roller 126 has traveled up to the cam portion 290", the toothed locking member 121 will again release the gear 114 and collar 112 for the purpose of opening the blank mold. This operation will be understood by reference to Figs. 1, 2, 17, 21, 22, 28 and 39; the position has been designated in the drawings as I.

The gear 114 and collar 112 being now entirely free to turn independently of the head 80 and the carriage 59, the mutilated bevel pinion 118, which after the reversing of the head has traveled with one of its flat surfaces along the guide 286, will come into engagement with the rack portion 287; this turns the mutilated pinion 118, pinion 116, gear 115, and gear 114 with the collar 112. (In the machine shown, the pinions and gears are arranged in such a manner that the gear 114 and collar 112 receive at this time a turn of one-sixth of a revolution.) This turning of the collar 112 will cause the rollers 111 traveling in the cam groove 112' to be shifted and the levers 108 to swing around their fulcrums 108' on the brackets 109 rigidly secured to the head 80 (Figs. 2 and 21). The rods 106 pivotally connected with the levers 108 at 106, will slide in the guides 107 in the direction toward the center of the machine, and this movement will be transmitted by means of the lever and link connection 103', 103, 96' to the arms 96 connected to the blank mold sections 97, in the manner described above. The arms 96 and blank mold sections 97 will thus be swung from the position shown in full lines in Fig. 21 to the position shown in the same figure in dotted lines. This open position of the blank mold is also shown in Fig. 38, and in Fig. 1 on the left-hand side. As described above, the blank mold sections are not connected rigidly with their respective arms 96, but pivotally at 98. As soon as the arms 96 begin to swing on their fulcrums (rock shafts 95) and to separate the blank mold sections, the springs 99 will cause the mold sections to remain in contact with each other at their outer edges as the arms 96 begin to move apart. Thus, as the arms 96 move about their axes, the blank mold sections will at first swing about their contacting outermost edges as a temporary axis or fulcrum, thus opening the blank mold first at the inner edges of its sections. During this initial opening movement, the mold sections will of course swing slightly on their pivots 98, relatively to the moving arms 96, until the pins 101 come in engagement with one of the end faces of the slots 102. From that moment on, the further opening movement of the arms 96 will cause the blank mold sections to swing in unison with the arms 96 about the respective fulcrums 95. I thus secure an initial swinging apart of the blank mold sections at their inner edges, before they are separated entirely. The purpose of this arrangement is to prevent the mold sections from exerting any strain on the surfaces of the glass engaged by them.

When the blank mold sections have assumed their open position, the roller 126 will have reached the end of the cam 290 and will drop from said end, allowing the toothed locking member 121 and dog 127 to engage the gear 113 and collar 112 respectively. The parts connected with said gear and collar will thus be held firmly in their position, and any accidental closing or further opening of the blank mold sections prevented.

It is well understood that in the preceding operation the blank mold only has been opened, while the neck mold remains in its closed position shown best in Fig. 34. The distended parison or partly formed bottle is now only held by the said neck mold and is suspended therefrom right side up.

The operation of my machine has so far only been described with reference to the functions of the blank mold and neck mold. In order to explain clearly the step of operation following now, I have first to describe certain functions which the blow mold and connected parts perform while the operations just described with regard to the blank mold take place:

At a point corresponding say to G, the blow mold, which has been traveling around the machine during the preceding steps or operations of the blank mold described above, with a finished bottle, will be opened in the following manner, in order to allow such bottle to be removed (this step will be understood from Figs. 2, 4, 5, 23, 24, 25, 31, 32, and 33): The roller 189' (Figs. 2 and 23) will be engaged from the rear by the stationary cam 297 (Figs. 4, 31, and 32). As this roller travels along the cam, the slide 188 (Figs. 23, 24, 25) will be pushed outward along the guides 179ª, causing the elbow levers 187 to swing on their fulcrums 187' and the slides 182 to move outward along the guides 179", so that the blow mold sections 184 carried by said slides 182 will become separated and assume the position shown in Fig. 25. The blow mold bottom remains in its former position and forms a partial support for the bottle, until this bottle is removed. Previous to the opening of the blow mold, the roller 213 has been engaged by the cam 300 (Fig. 5), so that the forked end 210" of the arm 210, which is normally in the position shown at the right in Fig. 5, will engage the neck of the bottle projecting from the blow mold, and will keep the bottle in an upright position when the blow mold opens. The bottle is then removed in any suitable manner, say at H. As soon as the roller 213 has cleared the cam 300, the spring 212 will pull the arm 210 back to its inoperative position.

The blow mold is now ready to receive one of the bottles partly formed in the blank mold, and for this purpose the blow mold must be raised so as to come into a position where it can close around this partly formed bottle, which, as explained above, is suspended from the neck mold. The body of glass having only been distended slightly so far, the blow mold need not be kept open entirely; before it begins its upward movement, I prefer to close it partly in a manner similar to the opening of the mold just described. A cam 298 (Figs. 4, 31 and 32) engages the roller 189' from the front; this engagement forces the slide 188 rearward toward its original position before the opening of the mold, and causes the slides 182 to move toward each other, thus effecting a partial closing of the blow mold, at a point between H and I.

At I the blow mold begins its upward movement. At this point the roller 180, which during all the operations described, has been running on a horizontal track formed on or by the baseplate 77 of the machine, rides up the inclined portion 295' of the cam 295 (Figs. 2, 3, 30 and 38). This causes the slide 179 and parts carried thereby to move upward in the vertical guides 178 provided in the sectors 71. In the meantime the partly formed bottle, being only held at its neck portion, may have become lengthened owing to its weight and viscid condition, so that its lower end is liable to extend down beyond its proper position; this would interfere with the closing of the blow mold. To prevent this, I have made the following arrangement: Toward the end of the upward movement of the slide 179 carrying the blow mold sections, the roller 209 (Fig. 2) will be engaged from below by the short cam 296 secured to the inner side of the cam 295 (Figs. 2 and 30). This will cause the rod 207, slide 204, rod 198 and blow mold bottle 197 carried thereby, to move upward independently of the slide 179 and blow mold sections 184. The bottom 197 will thus engage the lower end of the partly formed bottle in case it should have dropped too far, and will push it up. This raising of the mold bottom is also intended to insure a smooth outer surface of the bottom portion of the bottle. With the cam 296, as shown, the bottom of the bottle will receive a single push from below, but if desired, the cam may be shaped in such a way that it will impart two or more upward pushes to the mold bottom.

After clearing the cam 296, the roller 209 and connected parts move downward again, owing to their own weight and to the action of the spring 200 on the rod 198, thus bringing the blow mold bottom 197 back to its normal position relatively to the blow mold sections. The nuts 203 limit this downward movement.

In the meantime the roller 180 has reached the raised horizontal portion 295'' of the cam 295 and the blow mold sections have been brought to the proper position for closing around the partly formed bottle. This closing, which takes place at K, might be accomplished by a cam similar to the cam 298, and in the same manner as the partial closing described above. For the sake of safety, however, I have constructed a device which will operate the blow mold only under normal conditions, that is to say, when the partly formed bottle is in its proper position, but which will not close the blow molds positively in case there should be an obstacle to this closing movement, say through part of the glass body hanging down over the blow mold bottom. Near the point K, the roller 196 (Figs. 2, 4, 7) traveling in the circular groove 299', reaches the portion 299'' (Fig. 4) of this groove and is pushed outward, imparting this movement to the slide 194, 192, 190, and bringing it into such a position that the eye 190' in the outermost slide portion 190 will receive the upper end 189'' of the pin 189, when this pin carried by the slide 188 moves up with the slide 179 carrying the blow mold, as described above. The engagement of the pin 189 with the eye 190' occurs just before the end of the upward movement of the slide 179, so that the upper end 189'' of the pin will extend through said eye when the blow mold sections will have reached their uppermost position. When the roller 196 reaches the end of the groove portion 299'' (Fig. 4) and is compelled to return to the groove 299', the slide 194, 192, 190 will be pulled inward in its guide 191; this movement will bring the blow mold sections toward each other and will cause them to close around the partly formed bottle and the blow mold bottom 197, as shown on the right-hand side in Fig. 4.

As explained above, the blow mold sections 184 are not rigidly secured to the slides 182, but pivotally at 185. This loose connection allows the sections to swing slightly on their pivots, the swinging movement in either direction being limited by the engagement of the pins 186 with the rounded ends of the short segmental slots 182'. The advantage of such a loose connection lies in the fact that it need not be constructed in an absolutely accurate manner, as would be necessary for a rigid connection; moreover, the looseness of this connection will correct any inaccuracy which may occur in the construction or operation of the slides 182 or other parts connected therewith. The rib 184' on one section and groove 184'' on the corresponding section insure a proper engagement of the meeting faces of the two sections.

In case there should be some obstacle in the path of the blow mold sections, preventing them from closing, the springs 195 connecting the slide portions 192, 194 will allow the portion 192 to yield to the resistance offered to the closing of the mold sections, while the portion 194 moves inward with the roller 196. Thus I avoid serious injury to the machinery which might result if the closing of the blow mold were an absolutely positive movement.

The blow mold, and in fact all parts of the machine, are now in the position illustrated in Fig. 38, that is, the position of blowing the bottle. This blowing operation may begin at K, that is, immediately after the closing of the blow mold just described, but if desired, I may blow some air into the bottle before the blow mold is entirely closed. For this purpose I have shown in Fig. 1 two cams 270'' located between I and K and adapted to engage the roller 155. These cams are similar in operation to the cams 270' (Figs. 1, 15, 16 and 18), except that they are adapted to engaged the roller 155 from below (Figs. 1, 15$^a$, 16$^a$ and 18$^a$), this roller being now above the plate or support 85, owing to the reversing operation of the head 80 (see Fig. 1 on the left side, and Fig. 38). The blowing proper of the bottle then follows with one or any desired number of cams 270'' shown in Fig. 1 after K. It is evident that by making the cam which controls the admission of air for blowing the bottle, in a plurality of sections and making all these sections adjustable, I may vary the blowing action in different ways, as described above with reference to the cams 270, 270'.

After the blowing of the bottle has been completed, the neck mold, which so far has held the bottle by its neck portion, will be opened so as to release the bottle. This operation, which occurs at the point L (indicated in Figs. 1 and 28), is practically a continuation of the operation of opening the blank mold. The roller 126 rides up the cam portion 291 (Fig. 28), disengaging the toothed locking member 121 and dog 127 from the gear 114 and collar 112; the mutilated bevel pinion 118 will be engaged by the rack portion 287', causing the gear 114 and collar 112 to make one-sixth of a revolution in the same direction as before at the time of opening the blank mold. The blank mold sections will thus be swung out still further, that is, from the position shown in dotted lines in Fig. 21 to that shown in full lines in Fig. 22. As the arms 96 are rigidly secured to the rock shafts 95, the swinging movement of the arms 96 will rock these shafts and will bring the cams 95 (also secured rigidly to said rock shafts), from the position shown in dotted lines in Fig. 21 to the position shown in full lines in Fig. 22. The resulting engagement of the cams 94 with the roller 93 will swing the arms 89 outward on their fulcrums 89', pulling the neck mold sections 88 apart on their guides 86, against the pressure of the springs 90. The neck mold will thus be opened sufficiently to allow the neck of the bottle to be withdrawn therefrom. The roller 126 then drops into the gap 291'', allowing the toothed locking member 121 to engage the teeth of the gear 114 and to again lock this gear and the cam 114 to the carriage 59.

When the neck of the bottle has been released, the roller 180 connected with the slide 179 (Fig. 38) which carries the blow mold containing the finished bottle, will have reached the end of the raised portion 295'' of the cam 295 (Fig. 30) and will now travel down the incline 295*. After reaching the horizontal portion 77 (point N in the drawing), the roller 180 will continue to travel in this horizontal path around the machine; no further operations take place with the blow mold until it is opened for the purpose of removing the bottle, which step has been described above. Of course, the bottle may be removed now at any time, but I prefer to let the blow mold with the finished bottle travel to the point mentioned above as G before opening it, so as to give the glass of the bottle enough time to cool and to harden before the bottle is removed.

At the end of the blowing operation the roller 155 (Figs. 1, 2, 17) drops from the last one of the cams 270'' controlling the admission of air for blowing; the action of the springs 156, 156' will then bring the lever 154 into its normal position, that is the position where the pin 160 (Fig. 45) engages the recess 158'' in the rod 158. In this position the supply of air through the valve 233 (Fig. 17) is cut off. In case the springs 156, 156' should not act properly so that the supply of air will not be cut off or the plunger 149 not brought into its normal position, the roller 155 carried at the end of the forked lever 154 will be engaged by the stationary converging cam 283 (shown in Figs. 1, 48, 48ª) located at the point M of the machine's periphery. This converging cam will then bring the roller 155 and the plunger 149 back to their normal position.

At the same point M the nipple 148, which had been withdrawn from the bottle neck at the point C, will be reset in a manner similar to the withdrawal described above. The roller 147' (Fig. 38) will be engaged by a cam 259* (Fig. 1) similar to the cam 259 (shown in detail in Figs. 11, 12, 13). This will cause the gear 142 to rotate in a direction opposite to that in which it rotated at the point C. The rotation is transmitted to the barrel 140 and nipple 148, causing the latter to move lengthwise of its axis at the same time and to assume the position shown in Figs. 17 and 35ª.

In order to bring the blank and neck molds into position for receiving a supply of glass for a new bottle, at the point A, they will have to be closed and the head 80 carrying them reversed. These operations occur at the same time at the point O indicated in the drawings. Shortly before this point the roller 175 (Figs. 2 and 39) slides down from the cam on which it has been traveling, into the gap 294ᵇ (Fig. 29), carrying with it the slides 171, 167, and leaving the head free for the turning operation which follows. At O the mutilated gear 83ª will be engaged by the rack portion 293' (Fig. 28), turning the head around its axis f in the manner as described above for the reversing operation at the point G. At the beginning of this operation, the gear 114 and cam 112 are still locked to the carriage 59 by the toothed locking member 121 and dog 127 (Fig. 39), and do not, therefore, partake in this rotating movement. The rods 106 (Fig. 21) moving with the head 80 will cause the rollers 111 to travel in the groove 112' of the collar 112 held stationary, and this in turn will push the rods 106 outward and close the blank mold and the neck mold. The groove 112' of the collar 112 is constructed in such a manner that one-sixth of a revolution of the head will close the blank mold and neck mold entirely, the ribs 97' and grooves 97'' insuring proper engagement of the meeting faces of the blank mold sections.

At the beginning of the turning operation of the head 80 the short rod 132 forming part of the locking device shown in Fig. 17 has become disengaged from the head 177'' of the pin 177 shown in Figs. 46 and 46ª, and the locking bolt 128 has come into engagement with the face of the collar 112 adjacent to the head 80. As soon as the head in the course of its half-revolution, has progressed through one-sixth of a revolution, thereby closing the molds, the locking bolt 128 engages one of the two recesses 112'' (Fig. 17) on the collar 112, thus locking the collar and with it the gear 114 to the head. At the same time the roller 126 has been engaged by the cam portion 291' (Fig. 28), and the toothed locking member 121 and the dog 127 have become disengaged from the gear 114 and collar 112. The gear 114 and collar 112 are now free to turn with the head 80, and, being locked to said head by the locking bolt 128, they will turn with it during the remaining one-third of a revolution. The turning movement of the gear 114 will of course also turn the gear 115 meshing with it, the pinion 116 and the mutilated bevel pinion 118, a gap 288 (Fig. 28) being provided to allow this bevel pinion to turn freely. After the gear 114 has come to rest, the roller 126 will drop from the cam 291', allowing the toothed locking member 121 and dog 127 to engage the gear 114 and collar 112 respectively.

Near the end of the turning operation, at the point P, the braking and indexing device (slides 167, 171) come into action owing to the roller 175 traveling up the inclines 294ᶜ and 294ᵈ shown at the extreme right in Fig. 29. This braking and indexing operation being identical with the one described above in connection with the first reversal of the head 80 (point H), a further description of this operation will be superfluous. At this point, however, the slide 167 will remain in contact with the head 80 only a short while, as will be seen from Fig. 29; the roller 175 travels down to the cam portion 294ᵉ, so that the slide 167 will be clear of the head when the latter travels with the carriage 59 along the "dwell" track portions 55″, 56″ of the machine.

The finished bottle may be removed from the machine by hand, or by means of any suitable mechanical device.

It will be obvious that the cams 270, 270', 270″ may be so adjusted as to produce either a continuous admission of air for a greater or smaller length of time, or by throwing some of these cams out of action entirely, I may blow air intermittently, producing two or more blowing stages of either short duration (puffs) or relatively prolonged, with intermissions between such blowing stages.

While in the particular example described, the closed blow mold with the finished bottle therein, after being dropped to its lower position, as at M, travels beyond the point A at which the filling of the blank mold occurs, before the bottle is removed (as at H), it will be obvious that the opening of the blow mold and the removal of the bottle therefrom may take place at any point after M, that is to say, either before or after A, but of course before I. By arranging for the opening of the blow mold and for the removal of the bottle at a point beyond the starting point A, I am enabled to construct the machine of a smaller diameter than if the opening of the blow mold and the removal of the bottle were intended to take place before A.

This application is a division of my original application filed Aug. 14, 1914, Serial No. 857,464, renewed Sept. 21, 1921, as Serial No. 502,181.

The claims of this application are directed to the positioning of the blank mold for the charge obtaining operation, to the movement of the blank mold incident to such positioning, and to means for effecting such positioning and incidental movements. Claims directed to features other than herein claimed, including claims to the general combination, the timing of the several instrumentalities and specific details of the invention form the subject matter of my original application, hereinbefore referred to.

I claim:

1. In a machine for making molded articles, a frame having a track composed of a main portion in the form of a convex arc of a circle, and another portion, in the form of a concave arc of a circle, connecting the ends of said main portion, a carriage having means to engage said track and to travel along the same, mold portions connected with said carriage and adapted to pass substantially in registry with the center of said concave arc, and means for moving the carriage and for completing the formation of a molded article during the travel of the carriage.

2. In a machine for making molded articles, a frame having a track composed of a main portion, and another portion, in the form of a concave arc of a circle, connecting the ends of said main portion, a carriage having means to engage said track and to travel along the same, mold portions connected with said carriage and located on the same side as the center of said arc, and at a distance from said track-engaging means substantially equal to the radius of said arc, and means for moving the carriage and for completing the formation of a molded article during the travel of the carriage.

3. In a machine for making molded articles, a frame having a continuous track composed of a main portion, and another portion, in the form of an arc of a circle, connecting the ends of said main portion, a carriage having means to engage said track and to travel along the same, mold portions connected with said carriage and located on the same side of the track as the center of said arc, and at such a distance from the track as to pass substantially in registry with the center of said arc, and means for moving the carriage and for completing the formation of a molded article during the travel of the carriage.

4. In a machine for making molded articles, a frame having a track composed of a convex main portion and a concave portion connecting the ends of said main portion, a carriage having means to engage said track and to travel along the same, mold portions connected with said carriage and located on that side of the track toward which the concave track portion faces, and means for moving the carriage and for completing the formation of a molded article during the travel of the carriage.

5. In a machine for making molded articles, a stationary track having a dwell portion in the form of an arc of a circle, and a main travel portion, a carriage having means to engage said track and to travel along the same, mold portions connected with the carriage and located on the same side of the track as the center of said arc and at a distance from said track-engaging means substantially equal to the radius of said arc, and means for moving the carriage and for completing the formation of a molded article during the travel of the carriage.

6. In a machine for making molded articles, a stationary track having a dwell portion in the form of an arc of a circle, and a main travel portion, a carriage having means to engage said track and to travel along the same, mold portions connected with the carriage and arranged to pass in registry with the center of said arc so as to give said mold portions a dwell while the carriage continues to travel, and means for moving the carriage and for completing the formation of a molded article during the travel of the carriage.

7. In a machine for making molded articles, a stationary track having a dwell portion in the form of an arc of a circle, and a main travel portion, a carriage having means to engage said track and to travel along the same, mold portions connected with the carriage and arranged to pass in line with the center of said arc while the carriage travels along the dwell portion, and means for moving the carriage, and for completing the formation of a molded article while the carriage travels along said main portion of the track.

8. In a machine for making molded articles, a traveling carriage, mold portions connected with said carrier, means for actuating said carriage in such a manner that during a portion of its travel it will swing about the temporarily stationary axis of the said mold portions, to allow the mold to be filled readily notwithstanding the continued motion of the carriage, and means for forming a molded article as said mold portions travel with the carriage.

9. In a machine for making molded articles, a carriage, a mold connected therewith, means for causing the carriage to travel, a track for oscillating said carriage, of such shape as to cause the mold to remain substantially stationary during a portion of the travel of the carriage, and to follow the movement of the carriage during the remainder of its travel, and means for forming a molded article while the mold is advancing with the carriage.

10. In a machine for making molded articles, a carriage, a mold connected therewith, means for causing the carriage to travel, a track for oscillating said carriage, of such shape as to cause the axis of the mold to travel in a path having the form of a continuous curve with a re-entering point, and to remain substantially stationary when the mold axis is at said re-entering point, and means for completing the formation of a molded article while the mold is moving.

11. In a machine for making molded articles, a frame having a double track composed of two superposed sections each comprising a main portion in the form of a convex arc of a circle, and another portion, in the form of a concave arc of a circle, connecting the ends of said main portion, a carriage having superposed means to engage the respective sections of the said track and to travel along the same, mold portions connected with the said carriage and adapted to pass substantially in registry with the center of said concave arcs, means for moving the carriage, and means for completing the formation of a molded article during the travel of the carriage.

12. In a machine for making molded articles, a frame having a track comprising a main portion in the form of a convex arc of a circle, and another portion, in the form of a concave arc of a circle, connecting the ends of said main portion, a carriage having rollers, one in advance of the other, to engage the said track and to travel along the same, mold portions connected with the carriage and adapted to pass with their axis in substantial registry with the center of said concave arc, means for moving the carriage, and means for forming a molded article during the travel of the carriage.

13. In a machine for making molded articles, a frame having a double track composed of two superposed sections each comprising a main portion in the form of a convex arc of a circle, and another portion, in the form of a concave arc of a circle, connecting the ends of said main portion, a carriage having two sets of superposed rollers adapted to engage the respective sections of said track and to travel along the same, the two rollers which engage the same track section being arranged one in advance of the other, mold portions connected with said carriage and adapted to pass with their axis in substantial registry with the center of said concave arcs, means for moving the carriage, and means for forming a molded article during the travel of the carriage.

14. In a machine for making molded articles, a frame having a track comprising a main portion in the form of a convex arc of a circle, and a re-entrant portion connecting the ends of said main portion, a carriage having means to engage said track and to travel along the same, a carrier mounted to turn about the axis of said main track portion, two members connected with each other by a pivot parallel to said axis and having additional pivotal connections, likewise parallel to said axis, one member with the said carriage and the other member with said carrier, a mold connected with said carriage, means for moving the carrier and carriage, and means for forming a molded article during the travel of the carriage.

15. In a machine for making molded articles, a frame having a track comprising a main portion in the form of a convex arc of a circle, and a re-entrant portion connecting the ends of said main-portion, a carriage having means to engage said track and to travel along the same, a carrier mounted to turn about the axis of said main track portion, two members connected with each other by a pivot parallel to said axis and having additional pivotal connections, likewise parallel to said axis, one member with the said carriage and the other member with said carrier, a roller on the last-named member, a stationary cam, corresponding in arrangement to the track of the carriage and engaged by said roller, a mold connected with said carriage, means for moving the carrier and carriage, and means for forming a molded article during the travel of the carriage.

16. In a machine for making molded articles, a frame having a track comprising a main portion in the form of a convex arc of a circle, and a re-entrant portion connecting the ends of said main portion, a carriage having means to engage said track and to travel along the same, a carrier mounted to turn about the axis of said main track portion, two members connected with each other by a pivot parallel to said axis and having additional pivotal connections, likewise parallel to said axis, one member with the said carriage and the other member with said carrier, stationary guiding means corresponding in arrangement to the track of the carriage and in operative relation to the last-named member, a mold connected with the carriage, means for moving the carrier and carriage, and means for forming a molded article during the travel of the carriage.

17. In a machine for making molded articles, a frame having a track comprising a main portion in the form of a convex arc of a circle, and a re-entrant portion connecting the ends of said main portion, a carriage having means to engage said track and to travel along the same, a carrier mounted to turn about the axis of said main track portion, two superposed members one in supporting engagement with the other, and connected with each other by a pivot parallel to said axis, and having additional pivotal connections, likewise parallel to said axis, the upper member with said carriage and the lower member with said carrier, a mold connected with the said carriage, means for moving the carrier and carriage, and means for forming a molded article during the travel of the carriage.

18. In a machine for making molded articles, a frame having a track comprising a main portion in the form of a convex arc of a circle, and a re-entrant portion connecting the ends of said main portion, a carriage having means to engage said track and to travel along the same, a carrier mounted to turn about the axis of said main track portion, two superposed members one in supporting engagement with the other, and connected with each other by a pivot parallel to said axis, and having additional pivotal connections, likewise parallel to said axis, the upper member with said carriage and the lower member with said carrier, stationary guiding means, corresponding in arrangement to the track of the carriage and in operative relation to said lower member, a mold connected with the carriage, means for moving the carrier and carriage, and means for forming a molded article during the travel of the carriage.

19. In a machine for making molded articles, a frame having a track comprising a main portion in the form of a convex arc of a circle, and a re-entrant portion connecting the ends of said main portion, a carriage having means to engage said track and to travel along the same, a carrier mounted to turn about the axis of said main track portion, two members connected with each other by a pivot parallel to said axis and having additional pivotal connections, likewise parallel to said axis, one member with the said carriage and the other member with said carrier, a stationary guide, in operative relation to the last-named member, and having a main portion concentric with said axis and corresponding in location to the main portion of said track, and a re-entrant portion connecting the ends of the main guide portion, a mold connected with the carriage, means for moving the carrier and carriage, and means for forming a molded article during the travel of the carriage.

20. In a machine for making molded articles, a frame having a track comprising a main portion in the form of a convex arc of a circle, and a re-entrant portion connecting the ends of said main portion, a carriage having means to engage said track and to travel along the same, a carrier mounted to turn about the axis of said main track portion, two superposed members one in supporting engagement with the other, and connected with each other by a pivot parallel to said axis, and having additional pivotal connections, likewise parallel to said axis, the upper member with said carriage and the lower member with said carrier, means for limiting the swinging movement of the upper member, a mold connected with the said carriage, means for moving the carrier and carriage, and means for forming a molded article during the travel of the carriage.

21. In a machine for making molded articles, a frame having a track comprising a main portion in the form of a convex arc of a circle, and a re-entrant portion connecting the ends of the said main portion, a carriage having means to engage said track and to travel along the same, a carrier mounted to turn about the axis of said main track portion, two superposed members one in supporting engagement with the other, and connected with each other by a pivot parallel to said axis, and having additional pivotal connections, likewise parallel to said axis, the upper member with said carriage and the lower member with said carrier, means for limiting the swinging movement of the upper member, a stationary guide in operative relation to the upper member, a mold connected with said carriage, means for moving the carrier and carriage, and means for forming a molded article during the travel of the carriage.

22. In a machine for making molded articles, a frame having a track comprising a main portion in the form of a convex arc of a circle, and a re-entrant portion connecting the ends of said main portion, a carriage having means to engage said track and to travel along the same, a carrier mounted to turn about the axis of said main track portion, two members connected with each other by a pivot parallel to said axis and having additional pivotal connections, likewise parallel to said axis, one member with the said carriage and the other member with said carrier, means for adjusting the distance between the two pivotal connections of one of said members, a mold connected with said carriage, means for moving the carrier and carriage, and means for forming a molded article during the travel of the carriage.

23. In a machine for making molded articles, a frame having a track comprising a main portion in the form of a convex arc of a circle, and a re-entrant portion connecting the ends of said main portion, a carriage having means to engage said track and to travel along the same, a carrier mounted to turn about the axis of said main track portion, two members connected with each other by a pivot parallel to said axis and having additional pivotal connections, likewise parallel to said axis, one member with the said carriage and the other member with said carrier, a guide extending radially with reference to said connecting pivot and secured to one of said members, a bracket secured to the other member and adjustable along said guide, means for locking said bracket in its adjusting position, a mold connected with said carriage, means for moving the carrier and carriage, and means for forming a molded article during the travel of the carriage.

24. In a machine for making molded articles, a frame having a track comprising a main portion in the form of a convex arc of a circle, and a re-entrant portion connecting the ends of said main portion, a carriage having means to engage said track and to travel along the same, a carrier mounted to turn about the axis of said main track portion, two members connected with each other by a pivot parallel to said axis and having additional pivotal connections, likewise parallel to said axis, one member with the said carriage and the other member with said carrier, a head mounted to turn on the carriage about an axis located in a plane forming an angle with the first-named axis, a mold carried by said head, stationary means in operative relation to the head, to turn the latter at certain points in the travel of the carriage, means for moving the carrier and carriage, and means for forming a molded article during the travel of said carriage.

25. In a machine for making molded articles, a frame having a track comprising a main portion in the form of a convex arc of a circle, and a re-entrant portion connecting the ends of said main portion, a carriage having means to engage said track and to travel along the same, a carrier mounted to turn about the axis of said main track portion, two superposed members one in supporting engagement with the other, and connected with each other by a pivot parallel to said axis, and having additional pivotal connections, likewise parallel to said axis, the upper member with said carriage and the lower member with said carrier, a head mounted to turn on the carriage about an axis located transversely to the axis of said main track portion, a projection carried by the upper member and adapted to engage said head to limit the swinging of said upper member, a mold carried by said head, stationary means in operative relation to the head, for turning the latter at certain points in the travel of the carriage, means for moving the carriage, and means for forming a molded article during the travel of the carriage.

26. In a machine for making molded articles, a frame having a track comprising a main portion in the form of a convex arc of a circle, and a re-entrant portion connecting the ends of said main portion, a carriage having means to engage said track and to travel along the same, a carrier mounted to turn about the axis of said main track portion, two superposed members one in supporting engagement with the other, and connected with each other by a pivot parallel to said axis, and having additional pivotal connections, likewise parallel to said axis, the upper member with said carriage and the lower member with said carrier, a stationary guide, in operative relation to said lower member, and having a main portion concentric with said axis and corresponding in location to the main track portion, and a re-entrant portion connecting the ends of said main guide portion, a head mounted to turn on the carriage about an axis located transversely to the axis of said main track portion, a projection carried by the upper member and adapted to engage said head at the time said member is in operative relation to the re-entrant portion of said guide, a mold carried by said head, stationary means, in operative relation to the head, for turning the latter at certain points in the travel of the carriage, means for moving the carriage, and means for forming a molded article during the travel of the carriage.

27. In a machine for making molded articles, a frame having a track having an arc-shaped dwell portion, a carriage having means to engage said track and adapted to travel along the same, and a mold connected with said carriage and mounted to move in such a way that the mold axis will travel in a path similar to said track, the arc-shaped dwell portion of the carriage track having its center upon the path of the mold axis.

28. In a machine for making molded articles, a frame provided with a track having a portion curved according to the arc of a circle, a carriage provided with means to engage said track, a mold connected with said carriage, the distance of the mold axis from said track-engaging means being approximately equal to the radius of said circular arc, and the mold being located on the same side of the track-engaging means as the center of said arc, whereby, while the carriage is traveling along said arc, the axis of the mold will remain practically stationary, thus facilitating the filling of the mold, and means for completing the molded article during the travel of the carriage.

29. In a glass shaping machine, the combination with a continuously moving support, of a mold holder carried by said support and mounted for additional movement thereon a traveling blow mold, means for moving the holder relatively to said support to cause its mold to remain substantially stationary at a charging station, and for then positively moving the holder to its original position relative to the support and into alignment with the blow mold.

30. In a glass shaping machine, the combination with a continuously moving support, of a mold holder carried thereby and movable relatively thereto, a traveling blow mold, means for guiding said holder to cause its mold to remain substantially stationary at a charging station notwithstanding the motion of the support, means for so moving the holder, and for then positively moving the holder to its original position relative to the support and into alignment with the blow mold.

31. In a glass shaping machine, the combination with a movable support, of a traveling blow mold, a mold holder carried by said support and mounted for additional movement thereon, means for moving the holder relatively to said support, during the motion of the latter, to cause the axis of the mold to remain substantially stationary at a charging station while the support continues to move, and for then positively moving the holder to its original position relative to the support and into alignment with the blow mold.

32. In a glass shaping machine, the combination of a central standard, a blow mold mounted for continuous travel about said standard, a carrier, a blank mold and a neck mold mounted on said carrier, means for moving said carrier with the molds thereon so that at times said molds are in vertical alignment with the blow mold and at other times are retarded with respect thereto for a charging operation, a blow head and connections associated therewith, means for automatically moving the blow head in a predetermined order and time and while the blank and neck molds are traveling in vertical alignment with the blow mold into position over the blank mold to compact the charge of glass therein, automatic means including an air supply and connections operatively associated at a predetermined time with the opposite end of the blank mold and adjacent the neck mold effective subsequently and in timed relation to the compacting of the glass by the blow head to expand the parison in the blank mold to hollow form and into intimate contact with the walls thereof, a neck pin, and automatic means for actuating said neck pin to project the same upwardly and toward the interior of the blank prior to the receipt of the charge of glass in the blank and neck mold and for withdrawing said neck pin prior to the expansion of the parison to hollow form in the blank mold, and means for inverting the blank mold and neck mold.

33. In a glass shaping machine the combination of a blow mold, a support therefor, means for rotating said support at a constant angular speed, a carrier movable around the same axis as said support, a blank mold and a neck mold mounted on said carrier and adapted to cooperate with each other to partially shape a mass of glass, means for temporarily retarding the blank mold and neck mold in respect to the support for a glass charging operation, means for moving said molds at an angular speed greater than that of said support subsequent to the charging operation and then at the same speed as that of said support, a blow head and air connections associated therewith, means for automatically moving the blow head in a predetermined order and time and while the blank and neck molds are traveling at the same angular speed as the support, into position over the blank mold to compact the charge of glass therein, automatic means including an air supply and connections operatively associated at a predetermined time with the opposite end of the blank mold and adjacent the neck mold effective, subsequently and in timed relation to the compacting of the glass by the blow head, to expand the parison in the blank mold to hollow form and into intimate contact with the walls thereof, and means for moving the neck mold with the blank therein into cooperative relation with the blow mold.

34. In a glass shaping machine, the combination of a moving support, a plurality of blow molds mounted on said support, a plurality of carriers, a blank mold and a neck mold mounted on each carrier and adapted to cooperate with each other to partially shape a mass of glass, means for automatically arresting the travel of the molds upon each carrier and independently of the molds of the other carriers while continuing the movement of said support, a blow head and air connections associated therewith, means for automatically moving the blow head in a predetermined order and time and subsequent to the arrestation of the blank mold and neck mold into position over the blank mold to compact the charge of glass therein, automatic means including an air supply and connections, operatively associated at a predetermined time with the opposite end of the blank mold and adjacent the neck mold, effective subsequently and in timed relation to the compacting of the glass by the blow head, to expand the parison in the blank mold to hollow form and into intimate contact with the walls thereof, and means for moving the neck mold with the blank therein into cooperative relation with the blow mold.

35. In a glass shaping machine, the combination of a continuously traveling blow mold, a blank mold and a neck mold adapted to cooperate with each other to partially shape a mass of glass, means for causing the blank mold and the neck mold to travel at times with the blow mold, means for arresting the travel of said blank mold and neck mold while said blow mold continues to travel, and for accelerating said blank mold and said neck mold to cause them to resume their position of travel with the blow mold and in vertical alignment therewith, a blow head and air connections associated therewith, means for automatically moving the blow head in a predetermined order and time while the blank and neck molds are traveling with the blow mold, into a position over the blank mold to compact the charge of glass therein, automatic means including an air supply and connections operatively associated at a predetermined time with the opposite end of the blank mold and adjacent the neck mold, effective subsequently and in timed relation to the compacting of the glass by the blow head, to expand the parison in the blank mold to hollow form and into intimate contact with the walls thereof, means for inverting said blank and neck molds, and means for operating said molds to transfer a glass blank from the blank mold to the blow mold.

36. In a glass shaping machine the combination of a blow mold traveling continuously about a vertical axis, a blank mold and a neck mold movable about the same axis and adapted to cooperate with each other to partially shape a mass of glass, means for causing the blank mold and the neck mold to travel at times with the blow mold, means for arresting the travel of said blank mold and neck mold while said blow mold continues to travel and for accelerating said blank mold and neck mold to cause them to resume their original position relative to the blow mold and in vertical alignment therewith, a blow head and air connections associated therewith, means for automatically moving the blow head in a predetermined order and time while the blank and neck molds are traveling with the blow mold into a position over the blank mold to compact the charge of glass therein, automatic means including an air supply and connections operatively associated at a predetermined time to the opposite end of the blank mold and adjacent the neck mold effective subsequently and in timed relation to the compacting of the glass by the blow head to expand the parison in the blank mold to hollow form and into intimate contact with the walls thereof, means for rotating said blank mold and said neck mold about an axis different from said first named axis and means for operating said molds to transfer a blank from the blank mold to the blow mold.

37. In a glass working machine, the combination of a continuously moving support, a movable blank mold, a carriage for the blank mold movably mounted on said support and arranged to travel at all times therewith, automatic means operable in a predetermined order and time for causing a movement of the carriage with respect to the support whereby the blank mold is maintained substantially stationary at a charging position notwithstanding the travel of the carriage with the support.

38. In a glass working machine, the combination of the continuously traveling support, a blow mold arranged to continuously travel therewith, a movable blank mold, a carriage for the blank mold articulated to said support and arranged to travel continuously with said support and to normally maintain the blank mold in vertical alignment with the blow mold and means for causing a movement of the carriage on the support whereby the blank mold is retarded in respect to its normal movement and position in alignment with the blow mold, notwithstanding the travel of the carriage with the support.

39. In a glass working machine the combination of a support continously moving in a closed path, a blow mold mounted upon said support and arranged to travel therewith, a movable blank mold, a carriage for the blank mold movably mounted on said support and arranged to normally maintain the blank mold in vertical alignment with the blow mold and means for retarding the movement of the blank mold to maintain it substantially stationary at a charging position maintaining meanwhile a continued travel of the carriage in the direction of rotation of the support.

40. In a glass shaping machine the combination with a continuously traveling support, a blow mold carried thereby and arranged to travel therewith and to be moved into and out of a charging position, a traveling blank mold and neck mold, a carriage for the blank and neck molds movably mounted on said support and arranged to travel at all times with said support and in the same direction as said support, automatic means operable in a predetermined order and time for causing a movement of the carriage in respect to the support to accelerate the blank mold and neck mold in respect to the blow mold so as to bring it to the charging position in advance of the blow mold, to retain it at such charging position while the blow mold is passing through such position, and then to move the blank mold and neck mold at a speed in excess of the speed of the blow mold to cause registration thereof.

In testimony whereof, I have hereunto subscribed my name this 22nd day of January, 1924.

SYDNEY L. SEARS.